(12) United States Patent
Prateek et al.

(10) Patent No.: US 12,520,374 B2
(45) Date of Patent: Jan. 6, 2026

(54) TRANSMISSION PACKET BUNDLING FOR VOICE OVER NETWORK COMMUNICATIONS

(71) Applicant: QUALCOMM Incorporated, San Diego, CA (US)

(72) Inventors: Shat Prateek, Agra (IN); Harshal Jayesh Shah, Ahmedabad (IN); Shankar Ganesh Lakshmanaswamy, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 643 days.

(21) Appl. No.: 17/934,984

(22) Filed: Sep. 23, 2022

(65) Prior Publication Data

US 2024/0107623 A1    Mar. 28, 2024

(51) Int. Cl.
*H04W 76/28*    (2018.01)
*H04W 28/02*    (2009.01)

(52) U.S. Cl.
CPC ....... *H04W 76/28* (2018.02); *H04W 28/0236* (2013.01)

(58) Field of Classification Search
None
See application file for complete search history.

(56) References Cited

U.S. PATENT DOCUMENTS

| 2007/0071030 | A1  | 3/2007  | Lee |
| 2011/0310750 | A1  | 12/2011 | Lundsgaard |
| 2016/0295516 | A1* | 10/2016 | Su ........................ H04W 52/24 |
| 2017/0070909 | A1* | 3/2017  | Kim ................. H04W 52/0222 |
| 2018/0034736 | A1* | 2/2018  | Anchan ............... H04L 47/2433 |

FOREIGN PATENT DOCUMENTS

WO    2009026549 A1    2/2009

OTHER PUBLICATIONS

International Search Report and Written Opinion—PCT/US2023/032354—ISA/EPO—Dec. 5, 2023.

* cited by examiner

*Primary Examiner* — Angela Nguyen
(74) *Attorney, Agent, or Firm* — Procopio, Cory, Hargreaves & Savitch LLP

(57) ABSTRACT

A UE may obtain a first set of audio packets based on a configured periodic cycle with a network node. The UE may transmit, for the network node, a first set of uplink (UL) transmissions associated with the first set of audio packets based on a first periodic time interval. The first periodic time interval may be different than the configured periodic cycle. The first periodic time interval may be based on a first multiplier and the configured periodic cycle. The UE may be a transmitter UE. The network node may receive, from the transmitter UE, the first set of UL transmissions associated with the first set of audio packets based on the first periodic time interval. The network node may output, for a receiver UE, the first set of UL transmissions associated with the first set of audio packets.

29 Claims, 12 Drawing Sheets

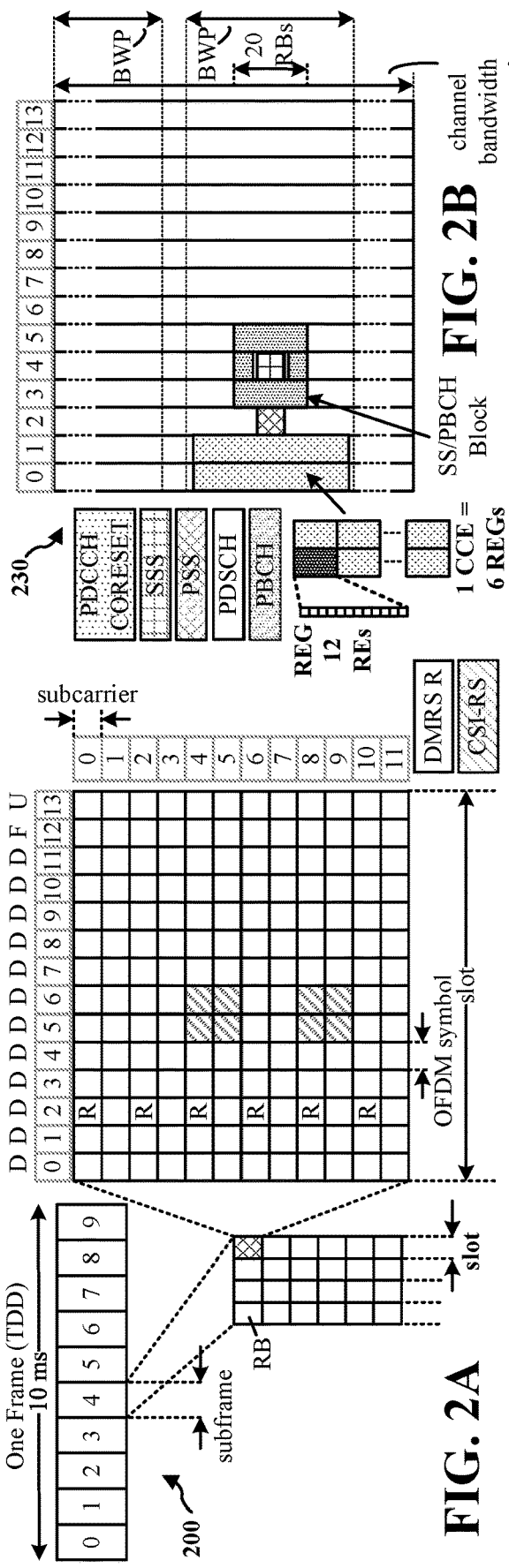
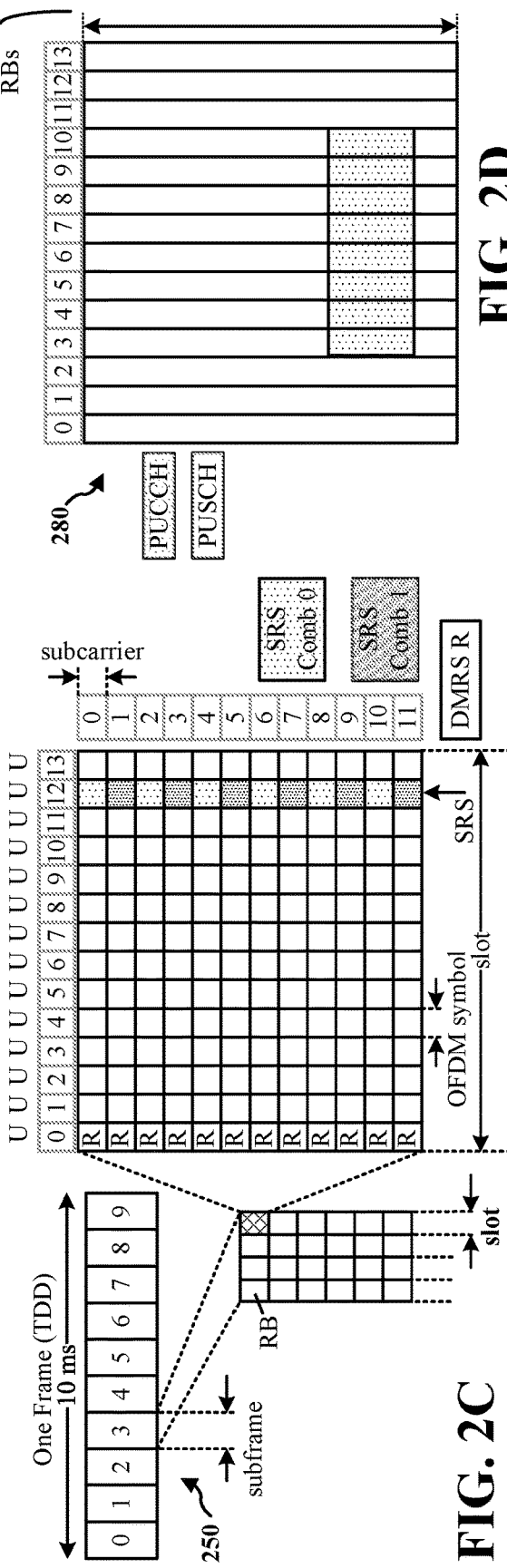
FIG. 2A
FIG. 2B
FIG. 2C
FIG. 2D

TRANSMISSION PACKET BUNDLING FOR VOICE OVER NETWORK COMMUNICATIONS

TECHNICAL FIELD

The present disclosure relates generally to communication systems, and more particularly, to a wireless device configured to transmit voice data using transmission packets.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may obtain a first set of audio packets based on a configured periodic cycle with a network node. The configured periodic cycle may be a connected mode discontinuous reception (CDRX) with the network node. The apparatus may transmit, for the network node, a first set of uplink (UL) transmissions associated with the first set of audio packets based on a first periodic time interval. The first periodic time interval may be different than the configured periodic cycle. The first periodic time interval may be based on a first multiplier and the configured periodic cycle.

In an aspect of the disclosure, a method, a computer-readable medium, and an apparatus at a network node are provided. The apparatus may receive, from a transmitter UE, a first set of UL transmissions associated with a first set of audio packets based on a first periodic time interval. The first periodic time interval may be different than a configured periodic cycle with the transmitter UE. The configured periodic cycle may be a CDRX cycle with the transmitter UE. The first periodic time interval may be based on a first multiplier and the configured periodic cycle. The apparatus may output, for a receiver UE, the first set of UL transmissions associated with the first set of audio packets.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink (DL) channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink (UL) channels within a subframe, in accordance with various aspects of the present disclosure.

DETAILED DESCRIPTION

Figure 1:
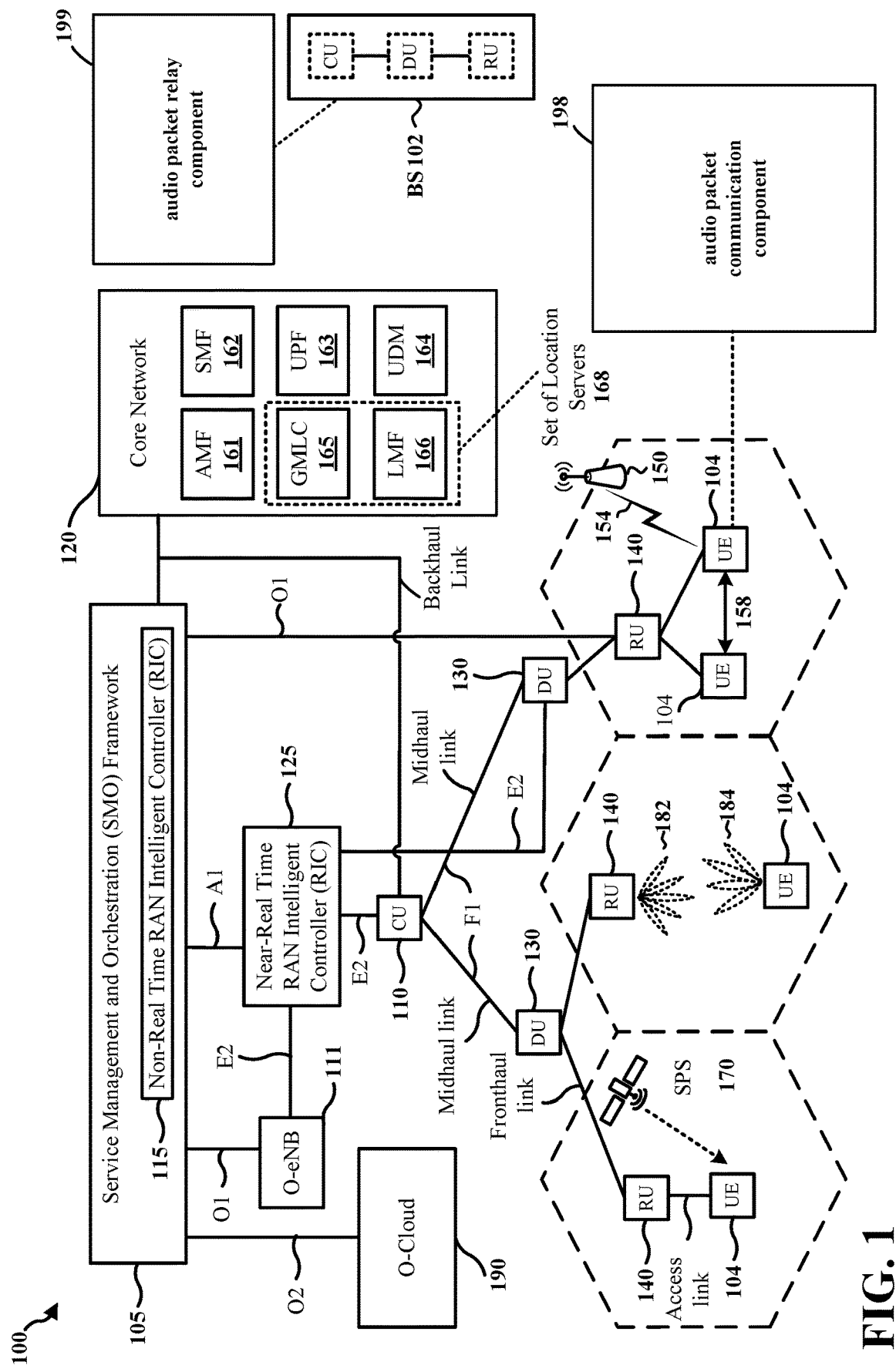
FIG. 1 is a diagram illustrating an example of a wireless communications system and an access network.

A transmitter user equipment (UE) may be configured to transmit audio packets over a network connection, for example using a voice over long-term evolution (LTE) (VoLTE) connection or a voice over new radio (NR) (VoNR) connection. The transmitter UE may obtain audio packets from a voice packetizer, and may transmit uplink (UL) transmissions of the audio packets to a network node. The network node may forward the transmissions to a receiver UE so that the audio packets may be heard on the receiver UE. The transmitter UE may be configured to transmit an UL transmission of audio packets to the network node periodically based on a time interval, for example a configured periodic cycle, such as a minimum default periodic cycle or a connected mode discontinuous reception (CDRX) cycle. However, periodically transmitting audio packets every configured periodic cycle may waste power, as components used to transmit the UL transmissions (e.g., a power amplifier) may use a lot of power, and the configured periodic cycle may be so frequent that the components may not be able to be switched to a low-power mode or a sleep mode in between transmissions.

In some aspects, a UE may be configured to bundle audio packets so that UL transmissions may be transmitted with longer periods in between UL transmissions, thereby reducing the overall number of UL transmissions and allowing transmission components to be switched to modes that use less power in between UL transmissions. The UE may obtain a first set of audio packets based on a configured periodic cycle with a network node. The UE may transmit, for the network node, a first set of UL transmissions associated with the first set of audio packets based on a first periodic time interval. The first periodic time interval may be different than the configured periodic cycle. The first periodic time interval may be based on a first multiplier and the configured periodic cycle. The UE may be a transmitter UE. The network node may receive, from the transmitter UE, the first set of UL transmissions associated with the first set of audio packets based on the first periodic time interval. The network node may output, for a receiver UE, the first set of UL transmissions associated with the first set of audio packets.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25

GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an audio packet communication component 198 configured to obtain a first set of audio packets based on a configured periodic cycle with a network node. The configured periodic cycle may be a CDRX cycle. The audio packet communication component 198 may transmit, for the network node, a first set of UL transmissions associated with the first set of audio packets based on a first periodic time interval. The first periodic time interval may be different than the configured periodic cycle. The first periodic time interval may be based on a first multiplier and the configured periodic cycle. In certain aspects, the base station 102 may have an audio packet relay component 199 configured to receive, from a transmitter UE, a first set of UL transmissions associated with a first set of audio packets based on a first periodic time interval. The first periodic time interval may be different than a configured periodic cycle with the transmitter UE. The first periodic time interval may be based on a first multiplier and the configured periodic cycle. The audio packet relay component 199 may output, for a receiver UE, the first set of UL transmissions associated with the first set of audio packets. Although the following description may be focused on audio packet relay communication, the concepts described herein may be applicable to other similar areas, such as transmitting any data collected in real-time, such as sensor data.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu 15$ kHz, where $\mu$ is the numerology 0 to 4. As such, the numerology $\mu=0$ has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
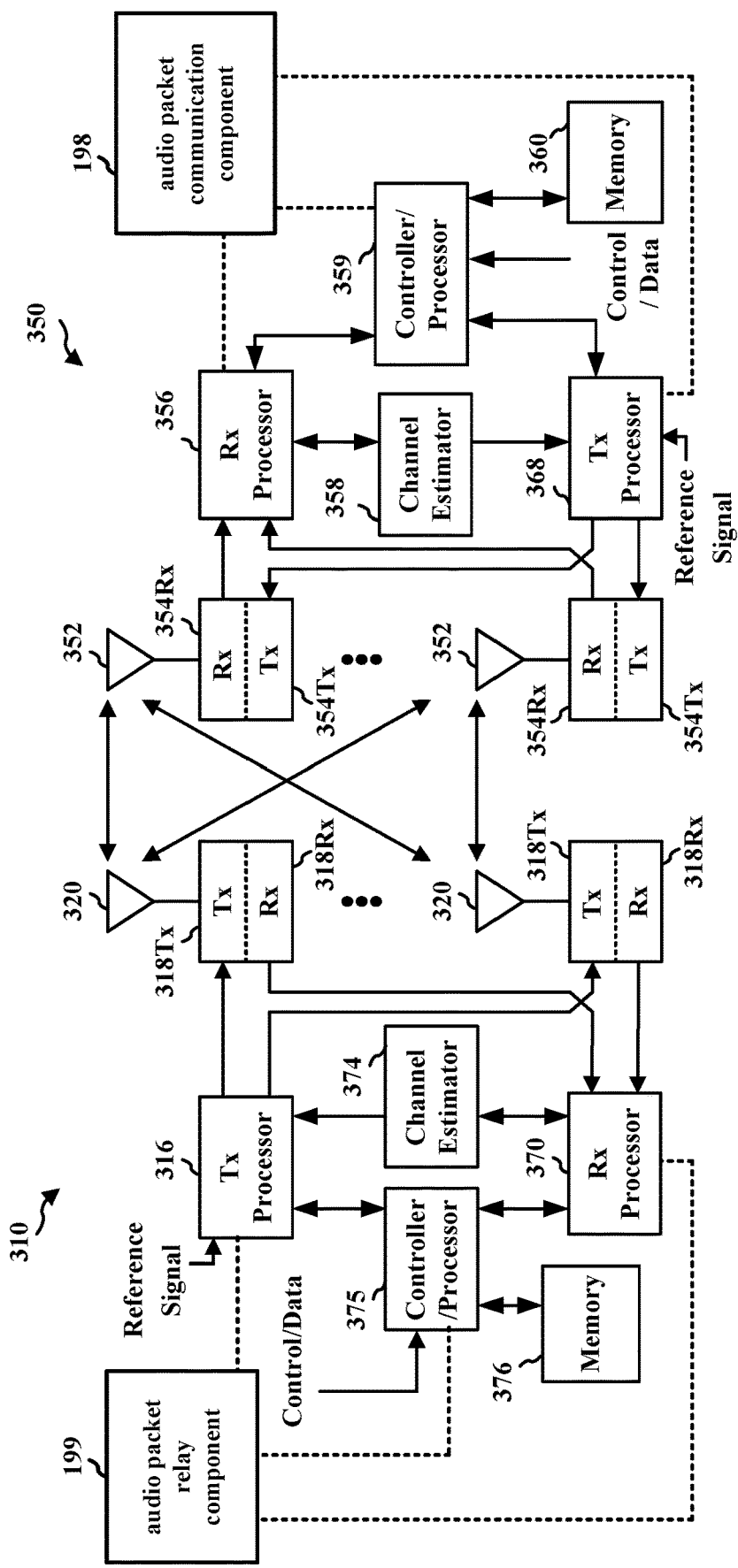
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (Tx) processor 316 and the receive (Rx) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The Tx processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (Rx) processor 356. The Tx processor 368 and the Rx processor 356 implement layer 1 functionality associated with various signal processing functions. The Rx processor 356 may perform spatial processing on the information to recover any spatial streams destined for the UE 350. If multiple spatial streams are destined for the UE 350, they may be combined by the Rx processor 356 into a single OFDM symbol stream. The Rx processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the Tx processor 368 to select the appropriate coding and modulation schemes, and to facilitate spatial processing. The spatial streams generated by the Tx processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a Rx processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the Tx processor 368, the Rx processor 356, and the controller/processor 359 may be configured to perform aspects in connection with the audio packet communication component 198 of FIG. 1.

At least one of the Tx processor 316, the Rx processor 370, and the controller/processor 375 may be configured to perform aspects in connection with the audio packet relay component 199 of FIG. 1.

Figure 4:
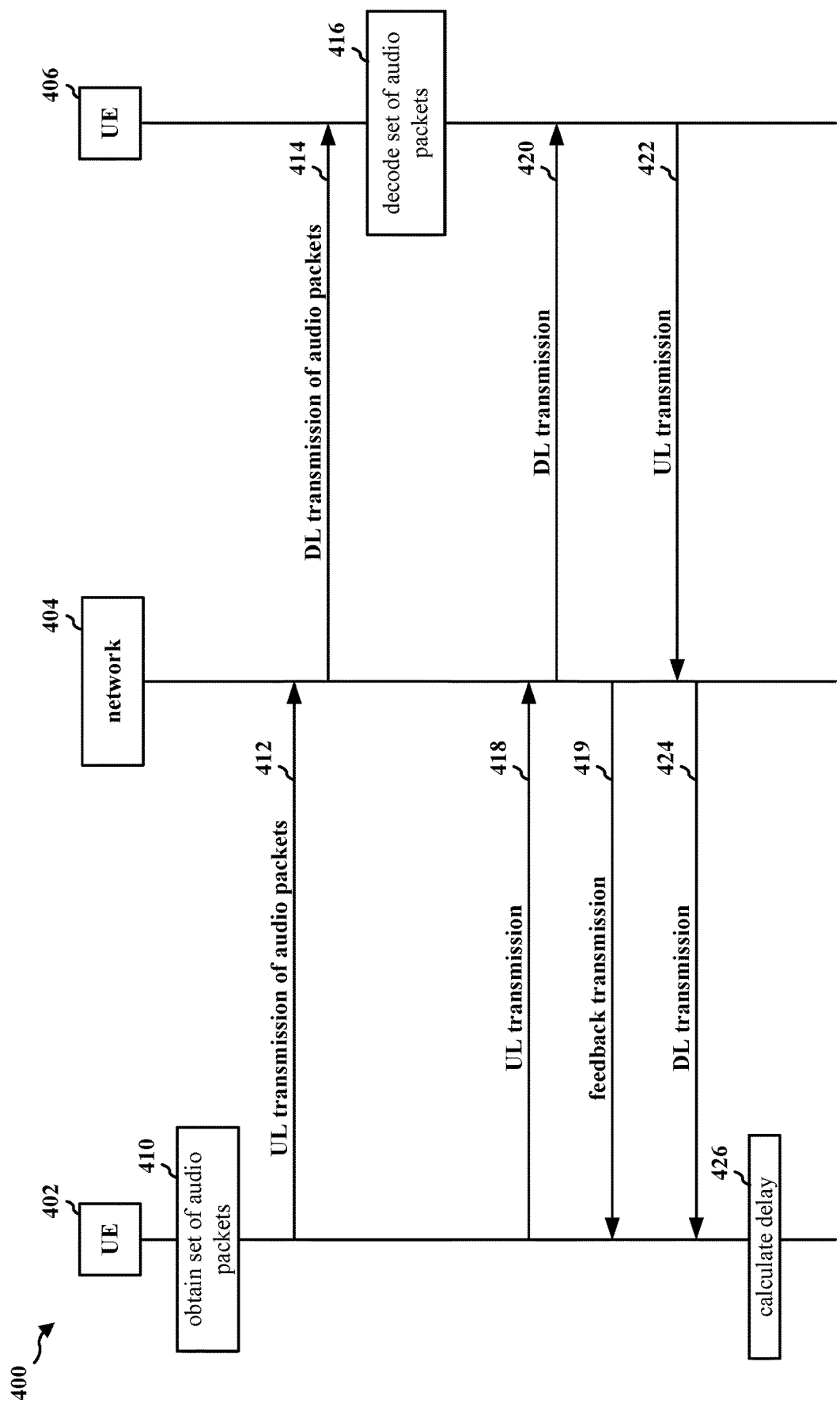
FIG. 4 is a connection flow diagram illustrating an example of a transmitter UE configured to output audio packets to a receiver UE via a network, in accordance with various aspects of the present disclosure.

FIG. 4 is a connection flow diagram 400 illustrating an example of a UE 402 configured to output audio packets to a UE 406 via a network 404. At 410, the UE 402 may obtain a set of audio packets, for example from a voice packetizer of the UE. A voice packetizer may be, for example, a microphone or a codec that packetizes analog audio data into a digital audio packet for transmission via a wireless signal. The UE 402 may obtain the set of audio packets by a modem, which may then transmit the UL transmission of audio packets 412 to a network 404. The UE 402 may transmit the UL transmission of audio packets 412 to a network node of the network 404, such as a base station 102 of FIG. 1.

The network 404 may obtain the UL transmission of audio packets 412 from the UE 402, and may output the UL transmission of audio packets 412 as the DL transmission of audio packets 414 to the UE 406. The network 404 may include any portion of a base station. In one aspect, the network 404 may receive the UL transmission of audio packets 412 from the UE 402 via an RU, and may transmit the DL transmission of audio packets 414 to the UE 406 via the same RU. In another aspect, the network 404 may receive the UL transmission of audio packets 412 from the UE 402 via a first RU, and may transmit the DL transmission of audio packets 414 to the UE 406 via a second RU. In one aspect, the first RU may output the UL transmission of audio packets 412 to a DU, which forwards the audio packets to the second RU. In another aspect, the first RU may output the UL transmission of audio packets 412 to a first DU, which forwards the audio packets to a CU that forwards the audio packets to a second DU that forwards the audio packets to the second RU. In another aspect, the first RU may output the UL transmission of audio packets 412 to a first DU, which forwards the audio packets to a first CU that forwards the audio packets to a core network that forwards the audio packets to a second CU that forwards the audio packets to a second DU that forwards the audio packets to the second RU. In other words, the UL transmission of audio packets 412 received from the UE 402 may be forwarded through a number of components of the network 404 before being transmitted to the UE 406 as the DL transmission of audio packets 414 via a network node of the network 404.

The UE 406 may receive the DL transmission of audio packets 414 from the network 404. At 416, the UE 406 may decode the UL transmission of audio packets 412, for example by a codec that decodes digital audio packets into analog audio data for processing, such as a speaker that outputs audio data.

The connection flow diagram 400 may represent a voice over network connection, such as a voice over LTE (VoLTE) connection or a voice over NR (VoNR) connection between the UE 402 and the UE 406. When a user talks to a microphone of the UE 402, the UE 402 may be configured to transmit the UL transmission of audio packets 412 to the network 404 periodically based on a time interval. The number of uplink occasions may contribute an amount of power consumption in the UE 402. For example, the power amplifier to transmit the UL transmission of audio packets 412 may be a significant contributor to power consumption as the power amplifier may operate at more than zero dBm. While the UE 402 transmits the UL transmission of audio packets 412, the UE 402 may use power to operate a number of RF components or baseband components of the UE 402. After the UE 402 transmits the UL transmission of audio packets 412, the UE 402 may stay awake if a following transmission is within a threshold amount of time (e.g., 20 milliseconds (ms)), whereas the UE 402 may activate a sleep mode if a following transmission is greater than the threshold amount of time.

In some aspects, the UE 402 may collect transmission parameters that may enable the UE 402 to monitor attributes of the UL transmission of audio packets 412. In one aspect, the UE 402 may determine a transmission delay (Tx delay) associated with the UE 402. The Tx delay may be estimated as a round trip time (RTT) delay between the UE 402 and the UE 406. The RTT may be calculated based on one or more real-time transport control protocol (RTCP) reports. For example, the UE 402 may transmit a first RTCP packet to the UE 406 with a first last sender report (SR) (LSR) time stamp. The first RTCP packet may be transmitted as the UL transmission 418 from the UE 402 to the network 404, and the DL transmission 420 from the network 404 to the UE 406. The UE 406 may transmit a second RTCP packet back to the UE 602 with a second LSR time stamp and a delay since last SR (DLSR) time stamp. The second RTCP packet may be transmitted as the UL transmission 422 from the UE 406 to the network 404, and the DL transmission 424 from the network 404 to the UE 402. At 426, the UE 402 may calculate the RTT delay between the UE 402 and the UE 406 by subtracting, from the time when the second RTCP packet is received, the DLSR from the second RTCP packet and the first LSR from the first RTCP packet. The UE 402 may estimate the Tx delay associated with the UE 402 by dividing the calculated RTT by two.

In another aspect, the UE 402 may monitor feedback from the network 404, for example feedback transmission 419. The network 404 may transmit the feedback transmission 419 to the UE 402 in response to receiving the UL transmission 418. The feedback transmission 419 may include, for example, a block level error rate (BLER) associated with the UL transmission 418. If the BLER increases, the UE 402 may understand that there may be increased noise or other impingements of its performance. The feedback transmission 419 may include, for example, one or more HARQ-ACK responses indicating an ACK or a NACK. The HARQ-ACK may be transmitted to the UE 402 as feedback transmission 419 in a plurality of possible HARQ occasions, for example three possible HARQ occasions spaced out by eight milliseconds (ms). In some aspects, if the UE 402 receives an ACK in a first occasion, the UE 402 may understand that the network 404 is not highly loaded, but if the UE 402 instead receives an ACK in the second or the third occasion, the UE 402 may understand that the network 404 is highly loaded.

The UL transmission 418, the UL transmission 422, the DL transmission 420, and the DL transmission 424 may be any transmissions suitable to allow the UE 402 to enable the UE 402 to monitor attributes of the UL transmission of audio packets 412. For example, the UL transmission 418 may be the UL transmission of audio packets 412 from the UE 402 to the network 404, and the DL transmission 420 may be the DL transmission of audio packets 414 from the network 404 to the UE 406. The UL transmission 422 may be an UL transmission of audio packets from the UE 406 to the network 404, and the DL transmission 424 may be a DL transmission of audio packets from the network 404 to the UE 402.

Figure 5A:
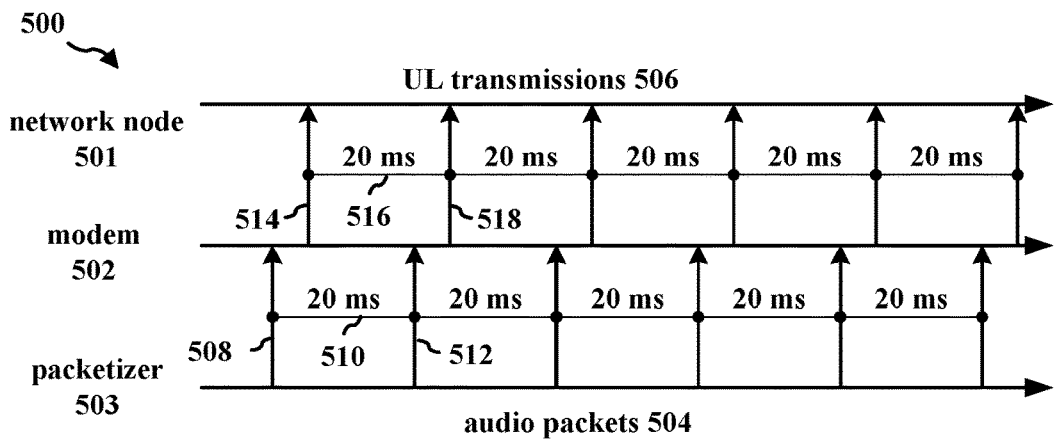
FIG. 5A is a diagram illustrating an example of an audio packet transmission schedule at a modem, in accordance with various aspects of the present disclosure.

FIG. 5A is a diagram 500 illustrating an example of an audio packet transmission schedule at a modem 502. The modem 502 may obtain a set of audio packets 504 from a component of a UE, such as the packetizer 503. The modem 502 may transmit a set of UL transmissions 506 for a network node 501 based on the set of audio packets 504. The packetizer 503 may include, for example, a voice packetizer or an audio packetizer. The packetizer 503 may convert an analog voice input into a digital audio packet that may be transmitted via a wireless network. The packetizer 503 may be configured to periodically output an audio packet, such as the audio packet 508 or the audio packet 512, based on a periodic time interval 510. The periodic time interval 510 may be based on a configured periodic cycle, for example 20 ms or 40 ms. The configured periodic cycle may be a CDRX cycle. The configured periodic cycle may be a minimum periodic cycle for the UE to transmit UL transmissions of voice packets or audio packets. The configured periodic cycle may be a default value, for example a value of 20 ms or 40 ms, if no CDRX cycle has been configured for the UE or by the UE. The packetizer 503 may be configured to periodically output the audio packet every configured periodic cycle. The modem 502 may be configured to periodically receive an audio packet of the set of audio packets 504, such as the audio packet 508 or the audio packet 512 based on the periodic time interval 510.

The modem 502 may be configured to transmit, for a network node 501, an audio packet from the set of audio packets 504. The network node may be a base station, such as the base station 102 in FIG. 1. In response to the modem 502 receiving the audio packet 508 from the packetizer 503, the modem 502 may transmit, for the network node 501, an UL transmission 514. In response to the modem 502 receiving the audio packet 512 from the packetizer 503, the modem 502 may transmit, for the network node 501, an UL transmission 518. The modem 502 may be configured to periodically transmit the UL transmissions 514 and 518 based on a periodic time interval 516. The periodic time interval 516 may be based on a configured periodic cycle, for example 20 ms or 40 ms. If the modem 502 is configured to immediately forward a received audio packet from the packetizer 503 to the network node 501, then the set of UL transmissions 506 may be periodically transmitted at the rate that the modem 502 receives the set of audio packets 504 from the packetizer 503. For example, if the audio packets 508 and 512 are periodically obtained from the packetizer 503 based on a configured periodic cycle, then if the modem 502 immediately forwards a received audio packet of the set of audio packets 504 as an UL transmission of the set of UL transmissions 506, the set of UL transmissions 506 may be automatically transmitted for the network node 501 periodically based on the configured periodic cycle. In one aspect, when a user is talking through a VoLTE or a VoNR call, the modem 502 may be configured to transmit an UL transmission of the set of UL transmissions 506 to the network node 501 every configured periodic cycle.

While a modem 502 configured to forward/transmit each of a received set of audio packets 504 received periodically every configured periodic cycle as a set of UL transmissions for a network node 501 periodically every configured periodic cycle may be simple to configure, such a modem may use a significant amount of power for the aforementioned reasons. A UE may be configured to reduce power consumption by using a larger periodic time interval, for example a time interval larger than a configured periodic cycle, to transmit the set of UL transmissions 506. By using a larger periodic time interval to transmit the set of UL transmissions 506 than the time interval used by the packetizer 503 to transmit the set of audio packets 504, the UE may reduce the amount of power the UE consumes to transmit the set of UL transmissions 506, such as the UL transmission 514 or the UL transmission 518.

Figure 5B:
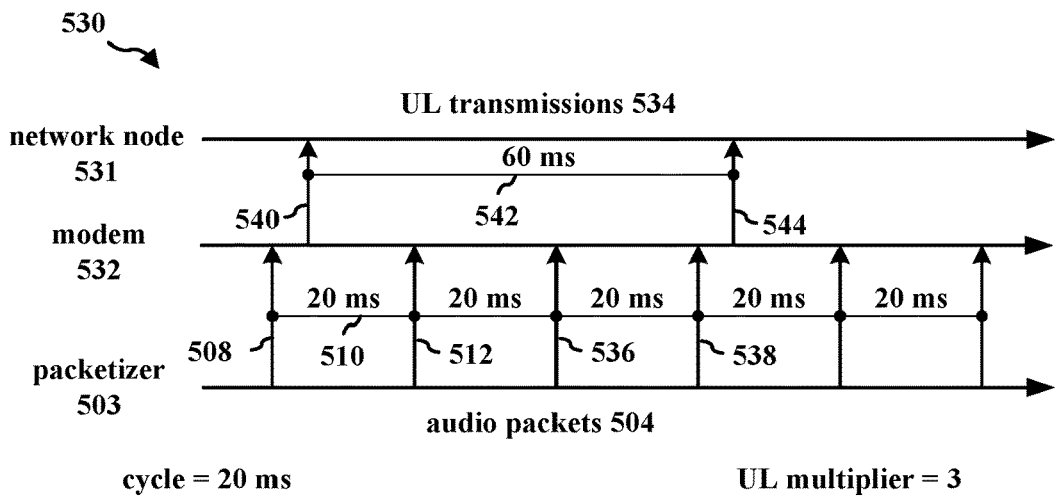
FIG. 5B is a diagram illustrating another example of an audio packet transmission schedule at a modem, in accordance with various aspects of the present disclosure.

FIG. 5B is a diagram 530 illustrating an example of an audio packet transmission schedule at a modem 532. The modem 532 may obtain a set of audio packets 504 from a component of a UE, such as the packetizer 503. The modem 532 may transmit a set of UL transmissions 534 for a network node 531 based on the set of audio packets 504. The packetizer 503 may include, for example, a voice packetizer or an audio packetizer. The packetizer 503 may convert an analog voice input into a digital audio packet that may be transmitted via a wireless network. The packetizer 503 may be configured to periodically output an audio packet, such as the audio packet 508 or the audio packet 512, based on a periodic time interval 510. The periodic time interval 510 may be based on a configured periodic cycle, for example 20 ms or 40 ms. The configured periodic cycle may be a CDRX cycle. The configured periodic cycle may be a minimum periodic cycle for the UE to transmit UL transmissions including voice packets or audio packets. The packetizer 503 may be configured to periodically output the audio packet every configured periodic cycle. The modem 532 may be configured to periodically receive an audio packet of the set of audio packets 504, such as the audio packet 508 or the audio packet 512 based on the periodic time interval 510.

The modem 532 may be configured to transmit, for a network node 531, a set of UL transmissions 534 based on the set of audio packets 504. The network node may be a base station, such as the base station 102 in FIG. 1. In response to the modem 532 receiving the audio packet 508 from the packetizer 503, the modem 532 may transmit, for the network node 531, an UL transmission 540 containing the audio packet 508. The modem 532 may be configured to transmit the UL transmission 544 after a periodic time interval 542. The periodic time interval 542 to transmit the set of UL transmissions 534 for the network node 531 may be larger than the periodic time interval 510 to obtain the set of audio packets 504 from the packetizer 503. The periodic time interval 542 may be based on a UL multiplier and a configured periodic cycle. A UL multiplier may be an integer that is multiplied against a time period, such as the configured periodic cycle, to increase a periodic time interval between UL transmissions, such as the periodic time interval 542 between the UL transmission 540 and the UL transmission 544. For example, the periodic time interval 542 may be a product of the UL multiplier 3 and the configured periodic cycle 20 ms, to provide a periodic time interval of 60 ms. In response to the modem 532 receiving the audio packet 512, the audio packet 536, and the audio packet 538, the modem 532 may transmit the UL transmission 544 after the periodic time interval 542. The UL transmission 544 may include the audio packet 512, the audio packet 536, and the audio packet 538. Since the modem 532 in FIG. 5B may be configured to transmit the set of UL transmissions 534 after greater periodic time intervals than the modem 502 in FIG. 5A, the modem 532 in FIG. 5B may save more power by allowing transmission components of the UE to be in a sleep mode for a longer period of time than the modem 502 in FIG. 5A.

If the modem 532 is configured to immediately forward collected audio packets as an UL transmission to the network node 531 after every third received audio packet from the packetizer 503, then the set of UL transmissions 534 may be periodically transmitted at one third the rate that the modem 532 receives the set of audio packets 504 from the packetizer 503. For example, if the audio packets 508, 512, 536, and 538 are periodically obtained from the packetizer 503 based on a configured periodic cycle, then if the modem 532 immediately forwards collected audio packets of the set of audio packets 504 as an UL transmission of the set of UL transmissions 534 after receiving every third audio packet, the set of UL transmissions 534 may be automatically transmitted for the network node 531 periodically based on the configured periodic cycle multiplied by the UL multiplier, or 20 ms×3=60 ms. In one aspect, when a user is talking through a VoLTE or a VoNR call, the modem 532 may be configured to transmit an UL transmission of the set of UL transmissions 534 to the network node 531 every configured periodic cycle multiplied by the UL multiplier.

Figure 5C:
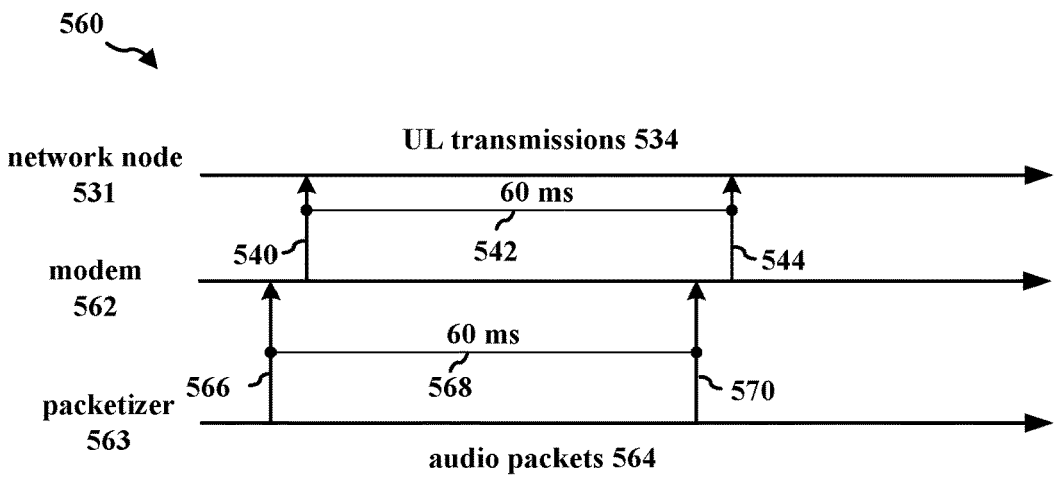
FIG. 5C is a diagram illustrating another example of an audio packet transmission schedule at a modem, in accordance with various aspects of the present disclosure.

FIG. 5C is a diagram 560 illustrating an example of an audio packet transmission schedule at a modem 562. The modem 562 may obtain a set of audio packets 564 from a component of a UE, such as the packetizer 563. The modem 562 may transmit a set of UL transmissions 534 for a network node 531 based on the set of audio packets 564. The packetizer 563 may include, for example, a voice packetizer or an audio packetizer. The packetizer 563 may convert an analog voice input into a digital audio packet that may be transmitted via a wireless network. The packetizer 563 may be configured to periodically output an audio packet, such as the audio packet 566 or the audio packet 570, based on a periodic time interval 568. The periodic time interval 568 may be based on a configured periodic cycle and a packet multiplier. The configured periodic cycle may be a CDRX cycle. The configured periodic cycle may be a minimum periodic cycle for the UE to transmit UL transmissions containing voice packets or audio packets. A packet multiplier may be an integer that is multiplied against a time period, such as the configured periodic cycle, to increase a periodic time interval between audio packets, such as the periodic time interval 568 between the audio packet 566 and the audio packet 570. The packetizer 563 may be configured to periodically output the audio packet every configured periodic cycle multiplied by the packet multiplier. For example, if the configured periodic cycle is 20 ms and the packet multiplier is 3, the packetizer 563 may be configured to periodically output an audio packet of the set of audio packets 564 every 60 ms. The modem 562 may be configured to periodically receive an audio packet of the set of audio packets 564, such as the audio packet 566 or the audio packet 570 based on the periodic time interval 568.

The modem 562 may be configured to transmit, for a network node 531, a set of UL transmissions 534 based on the set of audio packets 564. The network node may be a base station, such as the base station 102 in FIG. 1. In response to the modem 562 receiving the audio packet 566 from the packetizer 563, the modem 562 may transmit, for the network node 531, an UL transmission 540 containing the audio packet 566. The modem 562 may be configured to transmit the UL transmission 544 after a periodic time interval 542. The periodic time interval 542 to transmit the set of UL transmissions 534 for the network node 531 may be the same as the periodic time interval 568 to obtain the set of audio packets 564 from the packetizer 563. The periodic time interval 542 to transmit the set of UL transmissions 534 for the network node 531 may be different than the periodic time interval 568 to obtain the set of audio packets 564 from the packetizer 563. The periodic time interval 542 may be based on a UL multiplier and a configured periodic cycle. The configured periodic cycle may be a CDRX cycle. The configured periodic cycle may be a minimum periodic cycle for the UE to transmit UL transmissions containing voice packets or audio packets. For example, the periodic time interval 542 may be a product of the UL multiplier 3 and the configured periodic cycle 20 ms, to provide a periodic time interval of 60 ms. In response to the modem 562 receiving the audio packet 570, the modem 562 may transmit the UL transmission 544 after the periodic time interval 542. The UL transmission 544 may include the audio packet 570. Since the modem 562 in FIG. 5C may be configured to transmit the set of UL transmissions 534 after greater periodic time intervals than the modem 502 in FIG. 5A, the modem 562 in FIG. 5C may save more power by allowing transmission components of the UE to be in a sleep mode for a longer period of time than the modem 502 in FIG. 5A. Since the packetizer 563 in FIG. 5C may be configured to output the set of audio packets 564 to the modem 562 after greater periodic time intervals than the packetizer 503 in FIG. 5A, the packetizer 563 in FIG. 5C may save more power by allowing output components of the UE's packetizer to be in a sleep mode for a longer period of time than the packetizer 563 in FIG. 5A.

If the modem 562 is configured to immediately forward collected audio packets as an UL transmission to the network node 531 for every audio packet received from the packetizer 563, then the set of UL transmissions 534 may be periodically transmitted at the rate that the modem 562 receives the set of audio packets 564 from the packetizer 563. For example, if the audio packets 566 and 570 are periodically obtained from the packetizer 563 based on a product of the configured periodic cycle and the packet multiplier, then if the modem 562 immediately forwards collected audio packets of the set of audio packets 564 as an UL transmission of the set of UL transmissions 534 after receiving each audio packet, the set of UL transmissions 534 may be automatically transmitted for the network node 531 periodically based on the configured periodic cycle multiplied by the packet multiplier, or 20 ms×3=60 ms. In such an aspect, the modem 562 may not consider an UL multiplier. In one aspect, when a user is talking through a VoLTE or a VoNR call, the modem 562 may be configured to transmit an UL transmission of the set of UL transmissions 534 to the network node 531 every configured periodic cycle multiplied by the packet multiplier.

Figure 6:
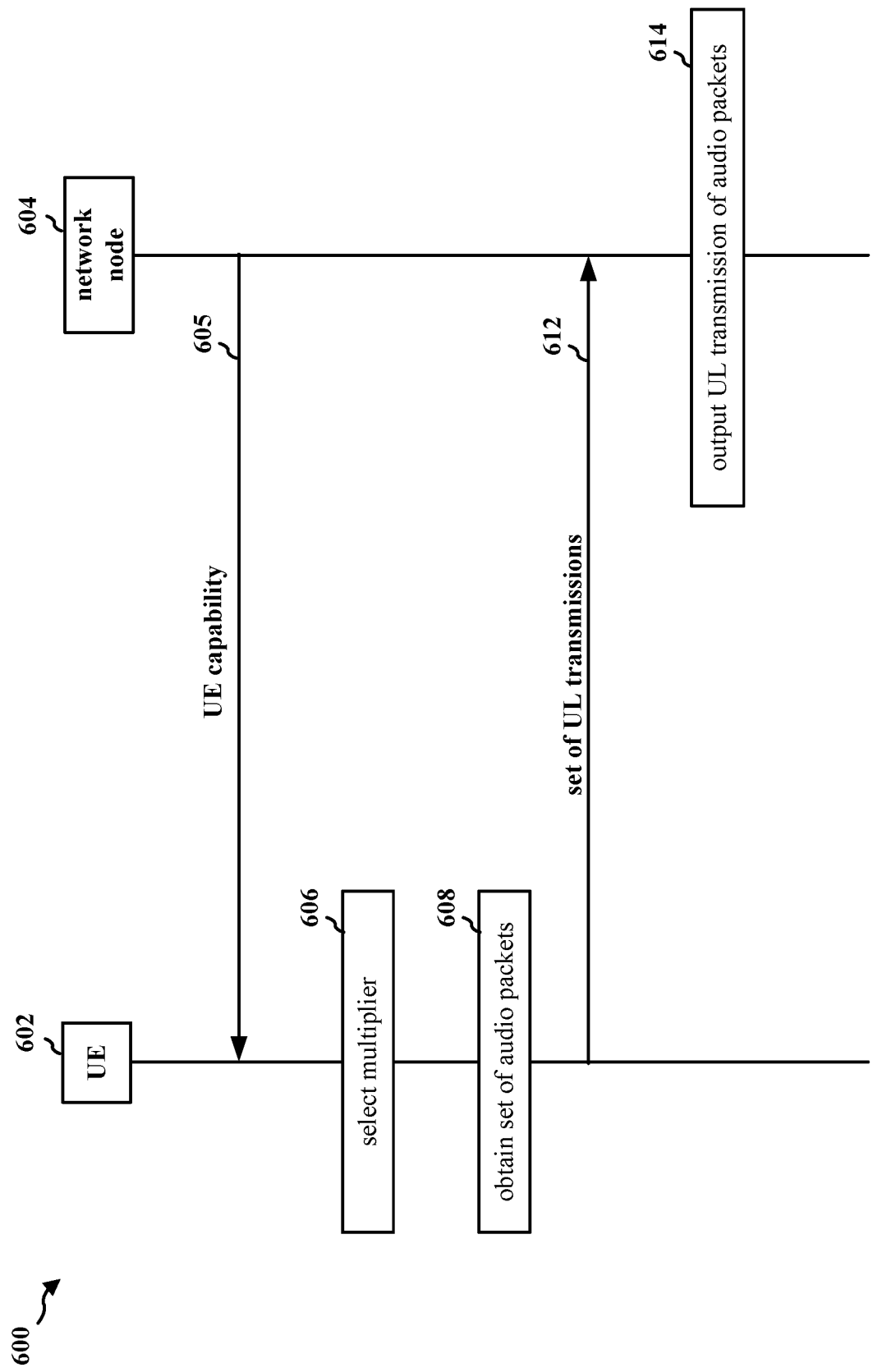
FIG. 6 is a connection flow diagram illustrating an example of a transmitter UE configured to output audio packets to a network node, in accordance with various aspects of the present disclosure.

FIG. 6 is a connection flow diagram 600 of a UE 602 configured to transmit a set of UL transmissions 612 associated with one or more audio packets to a network node 604. The UE 602 may be referred to as a transmitter UE or a transmission UE. The UE 602 may be the UE 104 in FIG. 1. The network node 604 may be the base station 102 in FIG. 1. The network node 604 may be configured to forward the set of UL transmissions 612 including audio packets from the UE 602 to a receiver UE, such as the UE 406 in FIG. 4 or the UE 704 in FIG. 7.

The network node 604 may transmit a UE capability 605 to the UE 602. The UE capability 605 may be associated with a receiver UE, such as the UE 406 in FIG. 4 or the UE 704 in FIG. 7. The UE capability may indicate whether the receiver UE is capable of transmissions of audio packets that do not correspond with a default periodic time interval, such as a configured periodic cycle. The configured periodic cycle may be configured by the network node 604. For example, the configured periodic cycle may be a CDRX cycle associated with the receiver UE. Transmissions sent based on a CDRX cycle timing may be more likely to be successfully received by a receiver UE in sleep mode than transmissions sent base on other periodic cycles. The configured periodic cycle may be a default periodic cycle configured by the network node 604 or the UE 602, for example in embodiments where the UE 602 may not know the CDRX cycle of the receiver UE.

At 606, the UE 602 may select a multiplier to use with a configured periodic cycle, or a minimum periodic time interval, for example a packet multiplier for the minimum periodic time interval between obtaining the set of audio packets from a voice or audio packetizer at 608 and/or a UL multiplier for the minimum periodic time interval between transmitting the set of UL transmissions 612. In some aspects, the UL multiplier may be equal to the packet multiplier. The minimum periodic time interval may be a CDRX cycle of a receiver UE, such as the UE 406 in FIG. 4 or the UE 704 in FIG. 7, to ensure that transmissions associated with audio packets may be received by the receiver UE. The multiplier may be used with a minimum periodic time interval to determine a periodicity between UL transmissions of the set of UL transmissions 612, and/or a periodicity between obtaining the set of audio packets at 608. In one aspect, a multiplier of one may mean that the periodicity is equal to a minimum periodic time interval. In another aspect, a multiplier of two may mean that the periodicity is equal to two minimum periodic time intervals.

In another aspect, a multiplier of four may mean that the periodicity is equal to four minimum periodic time intervals. In some aspects, the multiplier may be less than one, such as 0.25 or 0.5, while in other aspects the multiplier may be an integer greater or equal to one, ensuring that the periodic time interval is greater than the minimum periodic time interval. In some aspects, the UE 602 may select an UL multiplier of 1, for example if the UE 602 obtains the set of audio packets at 608 periodically based on a period that is greater than a configured periodic cycle. In other aspects, the UE 602 may select a greater UL multiplier, such as 2 or 3, for example if the UE 602 obtains the set of audio packets at 608 periodically based on a configured periodic cycle. The UE 602 may bundle data for audio packets from multiple configured periodic cycles together and transmit the bundle in one subframe. By bundling a number (N) of audio packets together, or merging data for a number of configured periodic cycles, the UE 602 may reduce the number of uplink transmissions by N−1 every N configured periodic cycles.

In some aspects, the UE 602 may select the multiplier based on the UE capability 605. For example, if the UE capability 605 indicates that a receiver UE may not be capable of handling transmissions of audio packets that are larger than a default periodic interval, or larger than a configured periodic cycle, the UE 602 may select a multiplier of one. In some aspects, the UE 602 may not select the multiplier based on the UE capability 605, trusting that a network node of the network, such as the network node 702 in FIG. 7, may be able to split a larger transmission of audio packets having a larger than default periodic interval into smaller audio packets having the default periodic time interval for the receiver UE.

The value of the multiplier may be dynamically selected at 606 based on at least one of a block error rate (BLER), a grant size, a delay, a size of at least one of the set of UL transmissions of the set of UL transmissions 612, a size of an audio packet of the set of audio packets obtained at 608, a number of concurrent HARQ packets allocated to the UE 602, a HARQ occasion that is used to receive a HARQ-ACK associated with an UL transmission of the set of UL transmissions 612, or a power savings mode associated with the UE 602.

In some aspects, the delay may be a Tx delay associated with the set of UL transmissions 612, which may be calculated in any suitable manner. For example, the Tx delay may be estimated by calculating an RTT between the UE 602 and a receiver UE (e.g., the UE 704 in FIG. 7), and dividing the RTT by two. As the Tx delay increases, the UE 602 may decrease a multiplier (e.g., a UL multiplier or a packet multiplier) to maintain delays having less than a perceptible difference. As the Tx delay decreases, the UE 602 may increase the multiplier to decrease power consumption while still maintaining delays having less than a perceptible difference. In some aspects, the BLER may be a Tx BLER associated with the set of UL transmissions 612. As the Tx BLER increases, the UE 602 may decrease the multiplier to support performance constraints. As the Tx BLER decreases, the UE 602 may increase the multiplier to decrease power consumption of the UE 602. In some aspects, the HARQ occasion used to receive the HARQ-ACK may be associated with which HARQ occasion an ACK from the network node 604 is transmitted. For example, if the UE 602 receives a HARQ-ACK from the network node 604 during the first HARQ occasion greater or equal to a threshold number (e.g., greater or equal to 90% of the time), then the UE 602 may understand that the network is not highly loaded, and may increase the multiplier. If the UE 602 receives a HARQ-ACK from the network node 604 during the first HARQ occasion less than or equal to a threshold number, then the UE 602 may understand that the network is highly loaded, and may decrease the multiplier. The HARQ occasion probability may be expressed as a binary indicator, for example a one for receiving an ACK in a HARQ-ACK in a first occasion over 90% of the time, or a zero for receiving an ACK in a HARQ-ACK in a first occasion at most 90% of the time. In some aspects, the grant size may be an UL grant size transmitted by the network node 604 to the UE 602. The network node 604 may select the UL grant size based on any suitable set of parameters, for example a signal-to-noise ratio (SNR) associated with the set of UL transmissions 612. The UL grant size transmitted by the network node 604 to the UE 602 that the UE 602 may use to transmit the set of UL transmissions 612 may constrain the selected multiplier, as a multiplier that is too large may cause the UE 602 to generate packets that are too large to fit within the UL grant size. (e.g., a packet generated using a multiplier of 4 may be larger than the UL grant size, but a packet generated using a multiplier of 2 may be less than the UL grant size). The grant size may be used to calculate a maximum multiplier supported by the UL grant size. A size of at least one of the set of UL transmissions of the set of UL transmissions 612 may be an UL Tx size used by a codec of the UE 602. For example, the codec may dictate a size of the packet for the set of UL transmissions. A single UL transmission of the set of UL transmissions 612 may include a plurality of UL Tx packets. The maximum multiplier supported by the UL grant size may be calculated as $$\left\lfloor \frac{UL \text{ grant size}}{ULTx \text{ size}} \right\rfloor.$$

In some aspects, the power savings mode associated with the UE 602 may be a low battery mode or a high thermal mode of the UE 602. The power savings mode may be expressed as a binary indicator, for example a one for a power savings mode being activated on the UE 602, and a zero for a power savings mode not being activated on the UE 602. If the UE 602 is in a low battery mode or a high thermal mode, the UE 602 may relax conditions or change threshold values used to determine when to increase or decrease the selected multiplier.

In one aspect, the UE 602 may select a multiplier such that a time interval, such as the periodic time interval between obtaining audio packets or the periodic time interval between the set of UL transmissions 612 may not exceed a maximum delay threshold. For example, a user at a receiver UE, such as the UE 704 in FIG. 7, may not notice a delay if the set of UL transmissions 612 is transmitted with a periodic time interval of 80 ms, but may notice a delay if the set of UL transmissions 612 is transmitted with a periodic time interval of 100 ms. In such an example, the UE 602 may set a maximum delay threshold to be 80 ms. If the configured periodic cycle of the UE 602 is 40 ms., the UE 602 may set a maximum multiplier supported by the UE 602 to be two. If the configured periodic cycle of the UE 602 is 20 ms., the UE 602 may set a maximum multiplier supported by the UE 602 to be four. If the UE 602 does not have a CDRX cycle (e.g., a CDRX cycle of zero), the UE may set its configured periodic cycle to 20 ms., and the UE 602 may set a maximum multiplier supported by the UE 602 to be four if the maximum delay threshold is set to be 80 ms. The maximum delay threshold may be calculated based on one or more parameters, such as (a) a length of time associated with the configured periodic cycle, (b) a latency mode associated with the UE, (c) a performance metric associated with the UE, (d) a battery condition associated with the UE, (e) a power savings mode associated with the UE, or (f) a thermal condition associated with the UE.

In one aspect, the UE 602 may select a multiplier based on a Tx delay and a set of Tx delay thresholds. For example, the UE 602 may have a plurality of delay thresholds delay_t [i], where i=1, 2, or 3, and delay_t[1]<delay_t[2]<delay_t [3]. The UE 602 may select a first multiplier (e.g., 4) if the Tx delay is less than delay_t[1], a second multiplier (e.g., 3) if the Tx delay is not less than delay_t[1] but is less than delay_t[2], or a third multiplier (e.g., 2) if the Tx delay is not less than delay_t[2] but is less than delay_t[3]. In some aspects, the delay thresholds may change based on if the UE 602 is in a power savings mode or is not in a power savings mode. For example, the UE 602 may have a plurality of delay thresholds delay_t_PS[i] and delay_t_N[i], where delay_t_PS corresponds to a delay threshold for a power savings mode, delay_t_N corresponds to a delay threshold for a normal mode, i=1, 2, or 3, delay_t_PS[1]<delay_t_PS [2]<delay_t_PS[3], delay_t_N[1]<delay_t_N[2]<delay_t_N [3], and delay_t_N[i]<<delay_t_PS [i]. In other words, it may be more likely for the UE 602 to decrease the value of the multiplier based on the Tx delay if the UE 602 is in a normal mode and it may be less likely for the UE 602 to decrease the value of the multiplier based on the Tx delay if the UE 602 is in a power savings mode.

In another aspect, the UE 602 may select a multiplier based on a Tx BLER and a set of Tx BLER thresholds. For example, the UE 602 may have a plurality of BLER thresholds BLER_t[i], where i=1, 2, or 3, and BLER_t[1]<BLER_t [2]<BLER_t[3]. The UE 602 may select a first multiplier (e.g., 4) if the Tx BLER is less than BLER_t[1], a second multiplier (e.g., 3) if the Tx BLER is not less than BLER_t [1] but is less than BLER_t[2], or a third multiplier (e.g., 2) if the Tx BLER is not less than BLER_t[2] but is less than BLER_t[3]. In some aspects, the BLER thresholds may change based on if the UE 602 is in a power savings mode or is not in a power savings mode. For example, the UE 602 may have a plurality of BLER thresholds BLER_t_PS[i] and BLER_t_N[i], where BLER_t_PS corresponds to a BLER threshold for a power savings mode, BLER_t_N corresponds to a BLER threshold for a normal mode, i=1, 2, or 3, BLER_t_PS[1]<BLER_t_PS[2]<BLER_t_PS[3], BLER_t_N[1]<BLER_t_N[2]<BLER_t_N[3], and BLER_t_N[i]<<BLER_t_PS[i]. In other words, it may be more likely for the UE 602 to decrease the value of the multiplier based on the Tx BLER if the UE 602 is in a normal mode and it may be less likely for the UE 602 to decrease the value of the multiplier based on the Tx BLER if the UE 602 is in a power savings mode.

In some aspects, a dynamic selection of a multiplier, such as an UL multiplier and/or a packet multiplier, may be controlled by a state machine that selects a UL multiplier or a packet multiplier based on a state of the UE 602. The state of the UE 602 may be selected based on one or more transmission parameters that the UE 602 may monitor. For example, Table 2 below may describe state machine logic that may determine a multiplier, such as a UL multiplier or a packet multiplier, that the UE 602 may select at 606

TABLE 2

| cycle | PS mode | Tx delay | Tx BLER | HARQ | max multiplier | multiplier |
|---|---|---|---|---|---|---|
| 20 | 1 | <delay_t_PS[1] | <BLER_t_PS[1] | 0/1 | 4 | 4 |
| 20 | 1 | <delay_t_PS[2] | <BLER_t_PS[2] | 0/1 | ≥3 | 3 |
| 20 | 1 | <delay_t_PS[3] | <BLER_t_PS[3] | 0/1 | ≥2 | 2 |
| 20 | 0 | <delay_t_N[1] | <BLER_t_N[1] | 1 | 4 | 4 |
| 20 | 0 | <delay_t_N[2] | <BLER_t_N[2] | 1 | ≥3 | 3 |
| 20 | 0 | <delay_t_N[3] | <BLER_t_N[3] | 0/1 | ≥2 | 2 |
| 40 | 1 | <delay_t_PS[3] | <BLER_t_PS[3] | 0/1 | 2 | 2 |
| 40 | 0 | <delay_t_N[3] | <BLER_t_N[3] | 1 | 2 | 2 |
| All others | | | | | | 1 |

The UE 602 may select a multiplier based on Table 2 above, giving higher preference to the higher rows. For example, the UE 602 may have a configured periodic cycle of 20 ms or 40 ms, a power-savings mode indicated by a one for an activated power-savings mode and a zero for a deactivated power-savings mode, a Tx delay that is estimated as RTT/2, a Tx BLER that is reported by feedback from the network node 604, a HARQ-ACK that is reported by feedback from the network node 604, where one may indicate over 90% of the ACKs of the HARQ-ACK to be received in the first HARQ occasion and zero may indicate at most 90% of the ACKs of the HARQ-ACK to be received in the first HARQ occasion, and a max multiplier which may be calculated based on a UL grant size, a UL Tx size, or a maximum delay. The UE 602 may select the multiplier using the Table 2 based on whether conditions in a row are satisfied. If the UE 602 uses the Table 2 to select a multiplier, the UE 602 may select a multiplier of four if the configured periodic cycle of the UE 602 is 20 ms., the UE 602 is in a power-savings mode, the estimated Tx delay of the UE 602 is less than delay_t_PS [1], the Tx BLER of the UE 602 is less than BLER_t_PS [1], and the max multiplier of the UE 602 is four. Else, the UE 602 may select a multiplier of three if the configured periodic cycle of the UE 602 is 20 ms, the UE 602 is in a power-savings mode, the estimated Tx delay of the UE 602 is less than delay_t_PS [2], the Tx BLER of the UE 602 is less than BLER_t_PS[2], and the max multiplier of the UE 602 is greater or equal to three. Else, the UE 602 may select a multiplier of two if the configured periodic cycle of the UE 602 is 20 ms, the UE 602 is in a power-savings mode, the estimated Tx delay of the UE 602 is less than delay_t_PS [3], the Tx BLER of the UE 602 is less than BLER_t_PS[3], and the max multiplier of the UE 602 is greater or equal to two. Else, the UE 602 may select a multiplier of four if the configured periodic cycle of the UE 602 is 20 ms, the UE 602 is in a normal mode (i.e., not in a power savings mode), the estimated Tx delay of the UE 602 is less than delay_t_N[1], the Tx BLER of the UE 602 is less than BLER_t_N[1], the UE 602 receives an ACK in its HARQ-ACK more than 90% of the time, and the max multiplier of the UE 602 is four. Else, the UE 602 may select a multiplier of three if the configured periodic cycle of the UE 602 is 20 ms, the UE 602 is in a normal mode, the estimated Tx delay of the UE 602 is less than delay_t_N[2], the Tx BLER of the UE 602 is less than BLER_t_N[2], the UE 602 receives an ACK in its HARQ-ACK more than 90% of the time, and the max multiplier of the UE 602 is greater or equal to three. Else, the UE 602 may select a multiplier of two if the configured periodic cycle of the UE 602 is 20 ms, the UE 602 is in a normal mode, the estimated Tx delay of the UE 602 is less than delay_t_N[3], the Tx BLER of the UE 602 is less than BLER_t_N[3], and the max multiplier of the UE 602 is greater or equal to two. Else, the UE 602 may select a multiplier of two if the configured periodic cycle of the UE 602 is 40 ms, the UE 602 is in a power savings mode, the estimated Tx delay of the UE 602 is less than delay_t_PS[3], the Tx BLER of the UE 602 is less than BLER_t_PS [3], and the max multiplier of the UE 602 is two. Else, the UE 602 may select a multiplier of two if the configured periodic cycle of the UE 602 is 40 ms, the UE 602 is in a normal mode, the estimated Tx delay of the UE 602 is less than delay_t_N[3], the Tx BLER of the UE 602 is less than BLER_t_N[3], the UE 602 receives an ACK in its HARQ-ACK more than 90% of the time, and the max multiplier of the UE 602 is two. Else, the UE 602 may select a multiplier of one.

At 608, the UE may obtain a set of audio packets from a packetizer, such as the packetizer 503 in FIG. 5B or the packetizer 563 in FIG. 5C. The UE 602 may obtain each audio packet of the set of audio packets periodically, based on a configured periodic cycle and/or a packet multiplier. The configured periodic cycle may be a CDRX cycle. In one aspect, similar to the modem 532 in FIG. 5B, the UE 602 may obtain each audio packet periodically every configured periodic cycle, such as every 20 ms or every 40 ms. In another aspect, similar to the modem 562 in FIG. 5C, the UE 602 may obtain each audio packet periodically based on a configured periodic cycle and a packet multiplier, such as every 60 ms (e.g., 20 ms configured periodic cycle and a packet multiplier of 3) or every 80 ms (e.g., 20 ms configured periodic cycle and a packet multiplier of 4, or 40 ms configured periodic cycle and a packet multiplier of 2).

The UE 602 may transmit the audio packets as the set of UL transmissions 612 to the network node 604. The network node 604 may receive the set of UL transmissions 612 from the UE 602. The UE 602 may transmit the audio packets at the set of UL transmissions 612 based on a configured periodic cycle and/or a UL multiplier. The configured periodic cycle may be a CDRX cycle. In one aspect, similar to the modem 532 in FIG. 5B, the UE 602 may obtain each audio packet periodically every configured periodic cycle, such as every 20 ms or every 40 ms, and may output the audio packets as a bundle of audio packets every configured periodic cycle multiplied by an UL multiplier, such as every 60 ms (e.g., 20 ms configured periodic cycle and an UL multiplier of 3) or every 80 ms (e.g., 20 ms configured periodic cycle and an UL multiplier of 4, or 40 ms configured periodic cycle and an UL multiplier of 2). In another aspect, similar to the modem 562 in FIG. 5C, the UE 602 may obtain each audio packet periodically based on a configured periodic cycle and a packet multiplier, such as every 60 ms (e.g., 20 ms configured periodic cycle and a packet multiplier of 3) or every 80 ms (e.g., 20 ms configured periodic cycle and a packet multiplier of 4, or 40 ms configured periodic cycle and a packet multiplier of 2) and my output the audio packets every configured periodic cycle multiplied by an UL multiplier, such as every 60 ms (e.g., 20 ms configured periodic cycle and an UL multiplier of 3) or every 80 ms (e.g., 20 ms configured periodic cycle and an UL multiplier of 4, or 40 ms configured periodic cycle and an UL multiplier of 2).

Figure 7:
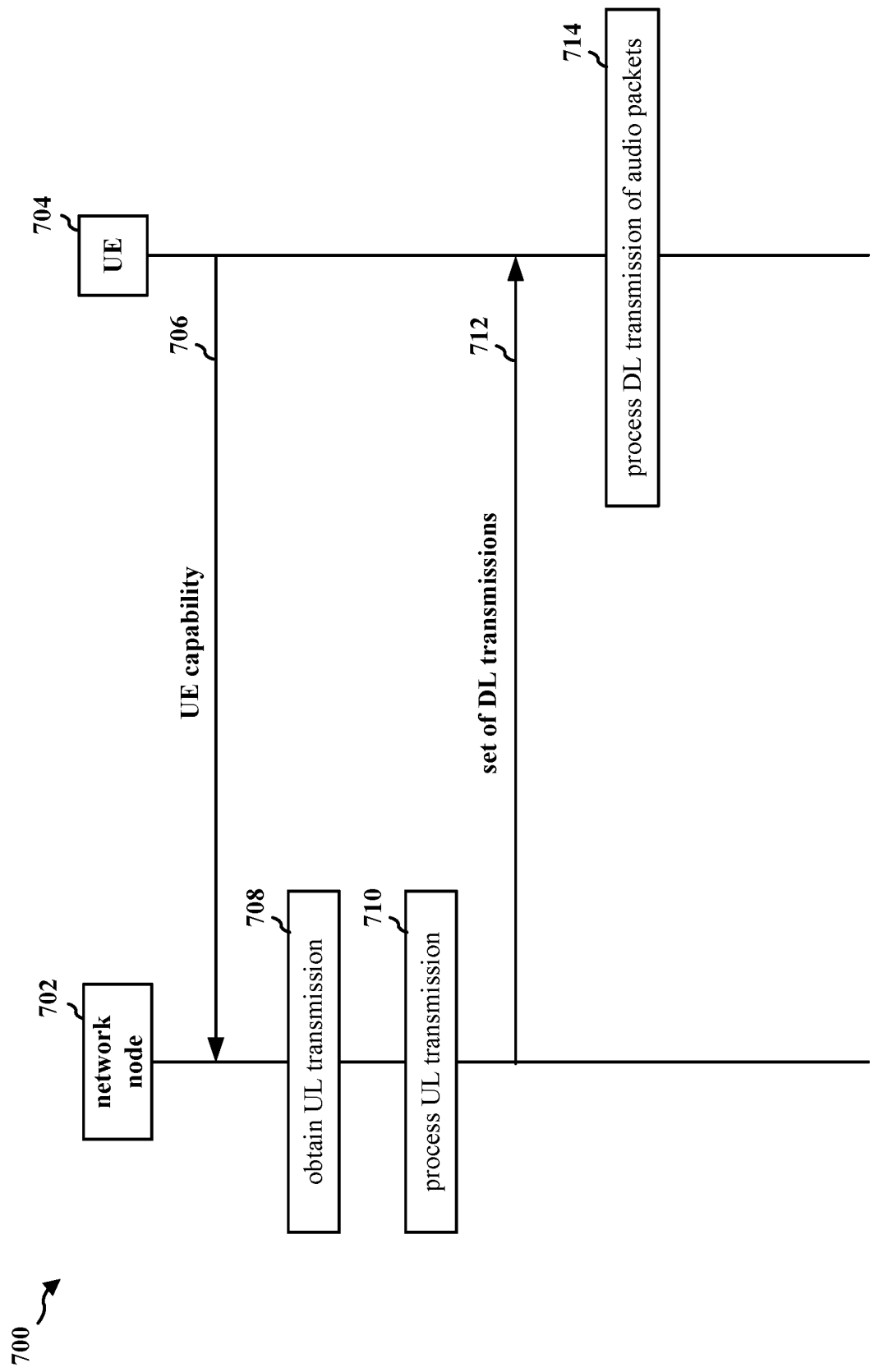
FIG. 7 is a connection flow diagram illustrating an example of a receiver UE configured to obtain audio packets from a network node, in accordance with various aspects of the present disclosure.

At 614, the network node 604 may output the set of UL transmissions 612 to other nodes of the network, such as the network node 702 in FIG. 7. The network node 604 may be configured to transmit the set of UL transmissions 612 to a receiver UE, such as the UE 704 in FIG. 7.

FIG. 7 is a connection flow diagram 700 of a network node 702 configured to transmit a set of DL transmissions 712 to a UE 704.

The UE 704 may transmit a UE capability 706 to the network node 702. The network node 702 may receive the UE capability 706 from the UE 704. In some aspects, the network node 702 may forward the UE capability 706 to a transmitter UE, such as the UE 602 in FIG. 6. In some aspects, the network node 702 may process the UE capability 706 to determine how to transmit the set of DL transmissions 712.

At 708 the network node 702 may obtain an UL transmission. The UL transmission may be, for example, an UL transmission from the network node 604 in FIG. 6. At 710, the network node 702 may process the UL transmission. If the UE capability 706 indicates that the UE 704 may be able to handle transmissions of audio packets of the size and/or periodicity of the UL transmission obtained at 708, the network node 702 may simply forward the UL transmission as the set of DL transmissions 712 to the UE 704. For example, the UE capability 706 may indicate that the UE 704 may be able to handle transmissions of audio packets with a periodic time interval every 80 ms, 40 ms, or 20 ms, and the UL transmission may be a bundle of audio packets having a periodic time interval of 80 ms. In response, the network node 702 may simply forward the UL transmission having a periodic time interval of 80 ms to the UE 704, where the set of DL transmissions 712 is transmitted using a periodic time interval of 80 ms. If the UE capability 706 indicates that the UE 704 may not be able to handle transmissions of audio packets of the size and/or periodicity of the UL transmission obtained at 708, the network node 702 may process the UL transmission at 710 to break the UL transmission down into audio packets of the size and/or periodicity that the UE 704 may handle, and transmit the processed UL transmission as the set of DL transmissions 712 to the UE 704. For example, the UE capability 706 may indicate that the UE 704 may be able to handle transmissions of audio packets with a periodic time interval every 20 ms, and the UL transmission may be a bundle of audio packets having a periodic time interval of 80 ms. In response, the network node 702 may process the UL transmission at 710 by splitting the UL transmission into four transmissions of audio packets with a periodic interval of 20 ms, and transmit the audio packets as the set of DL transmissions 712 is transmitted using a periodic time interval of 20 ms.

At 714 the UE 704 may process the set of DL transmissions 712 of audio packets, for example by decoding the transmission and playing the audio packets on a speaker of the UE 704. In some aspects, the set of DL transmissions 712 may be received by the UE 704 based on a multiplier and a default periodic time interval, or configured periodic cycle (e.g., a multiplier of 3 and a configured periodic cycle of 20 ms, resulting in a periodic time interval of 60 ms). In some aspects, the set of DL transmissions 712 may be received by the UE 704 as a function of a default time interval, or configured periodic cycle (e.g., a default time interval or a configured periodic cycle of 20 ms, resulting in a periodic time interval of 20 ms).

Figure 8:
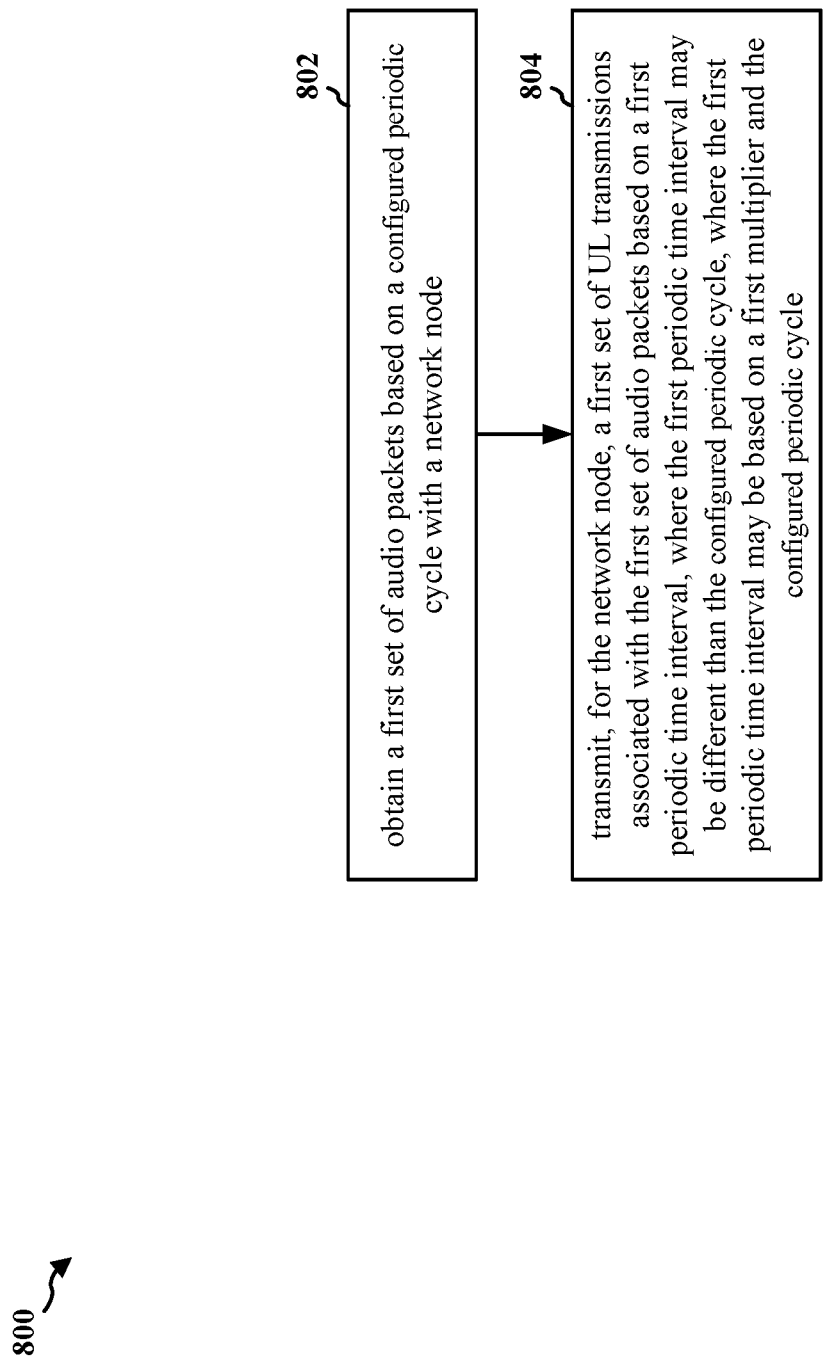
FIG. 8 is a flowchart of a method of wireless communication.

FIG. 8 is a flowchart 800 of a method of wireless communication. The method may be performed by a UE (e.g., the UE 104, the UE 350, the UE 402, the UE 602, the UE 704; the modem 532, the modem 502, the modem 532, the modem 562; the apparatus 804). At 802, the UE may obtain a first set of audio packets based on a configured periodic cycle with a network node. For example, 802 may be performed by the modem 532 in FIG. 5B, which may obtain a set of audio packets (e.g., audio packets 512, 536, and 538) from the packetizer 503 based on a configured periodic cycle of 20 ms with the network node 531. Moreover, 802 may be performed by the component 198 in FIG. 10.

At 804, the UE may transmit, for the network node, a first set of UL transmissions associated with the first set of audio packets based on a first periodic time interval. The first periodic time interval may be different than the configured periodic cycle. The first periodic time interval may be based on a first multiplier and the configured periodic cycle. For example, 804 may be performed by the modem 532 in FIG. 5B, which may transmit, for the network node 531, a set of UL transmissions (e.g., UL transmission 544) associated with the set of audio packets (e.g., audio packets 512, 536, and 538) based on the periodic time interval 542 of 60 ms. The periodic time interval 542 of 60 ms may be different than the configured periodic cycle of 20 ms. The periodic time interval 542 of 60 ms may be based on the UL multiplier of three and the configured periodic cycle of 20 ms. Moreover, 804 may be performed by the component 198 in FIG. 10.

Figure 9:
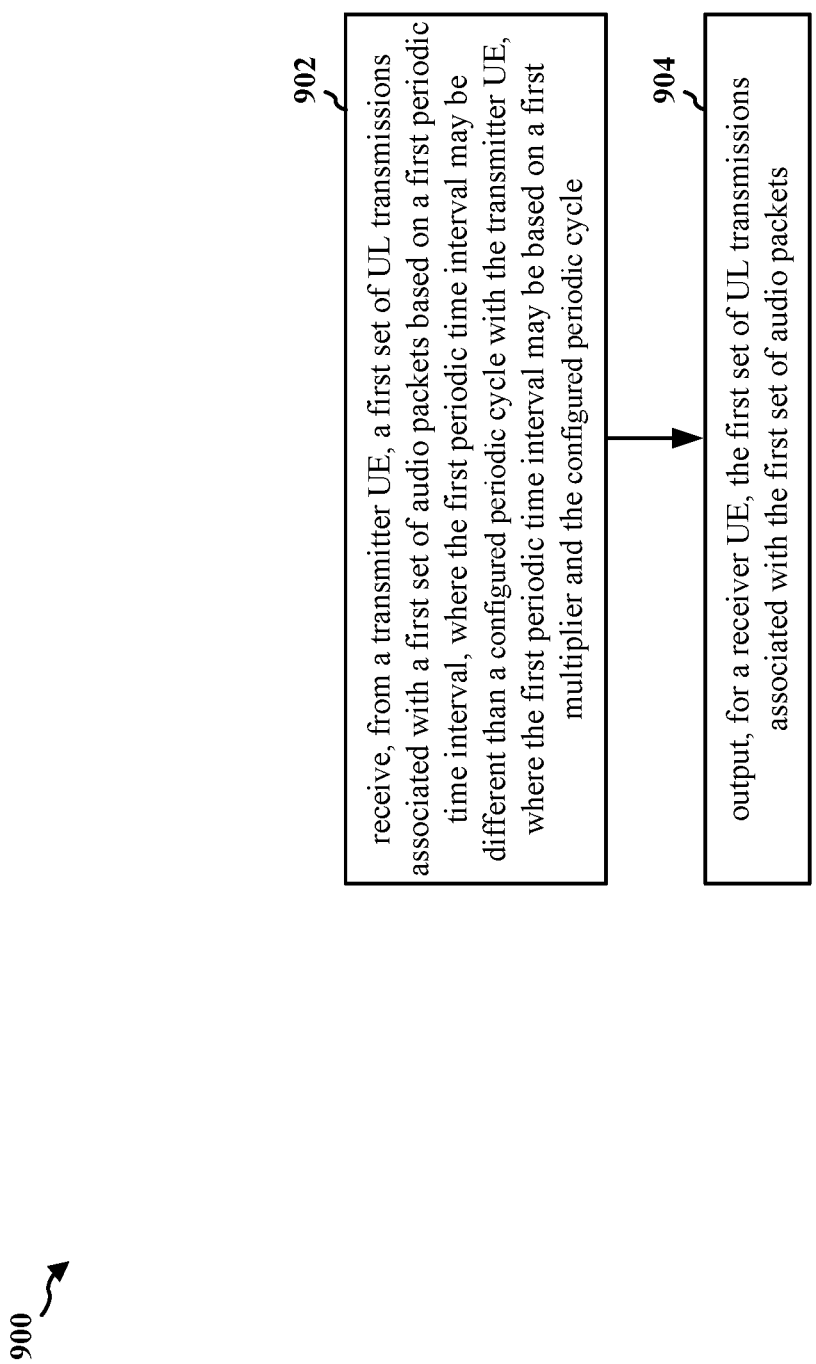
FIG. 9 is another flowchart of a method of wireless communication.

FIG. 9 is a flowchart 900 of a method of wireless communication. The method may be performed by a network node (e.g., the base station 102, the base station 310, the network 404; the network node 501, the network node 531, the network node 604, the network node 702; the network entity 1002, the network entity 1102, the network entity 1260). At 902, the network node may receive, from a transmitter UE, a first set of UL transmissions associated with a first set of audio packets based on a first periodic time interval. The first periodic time interval may be different than a configured periodic cycle with the transmitter UE. The configured periodic cycle may be a CDRX with the transmitter UE or the receiver UE. The first periodic time interval may be based on a first multiplier and the configured periodic cycle. For example, 902 may be performed by the network node 531 in FIG. 5B, which may receive, from the modem 532 of a transmitter UE, such as the UE 602 in FIG. 6, a set of UL transmissions (e.g., UL transmission 544) associated with a set of audio packets (e.g., audio packets 512, 536, and 538) based on the periodic time interval 542 of 60 ms. The periodic time interval 542 of 60 ms may be different than the configured periodic cycle of 20 ms. The periodic time interval 542 of 60 ms may be based on the UL multiplier of three and the configured periodic cycle of 20 ms. Moreover, 902 may be performed by the component 199 in FIG. 11 or FIG. 12.

At 904, the network node may output, for a receiver UE, the first set of UL transmissions associated with the first set of audio packets. For example, 904 may be performed by the network node 604 in FIG. 6, which may, at 614, output, for a receiver UE (e.g., the UE 704 in FIG. 7), the set of UL transmissions 612 associated with the audio packets obtained at 608. Moreover, 904 may be performed by the component 199 in FIG. 9 or FIG. 10.

Figure 10:
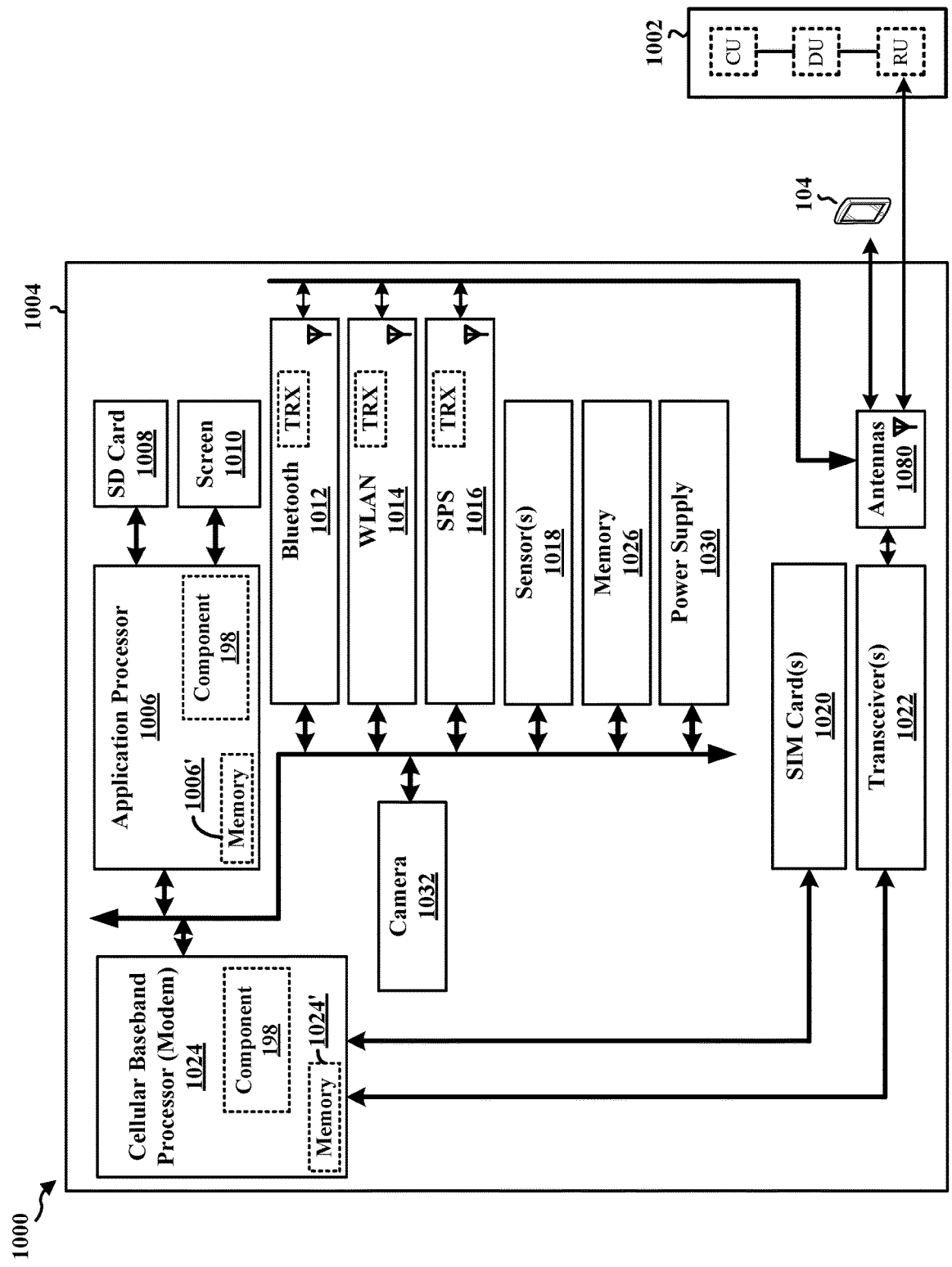
FIG. 10 is a diagram illustrating an example of a hardware implementation for an example apparatus and/or network entity.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include a cellular baseband processor 1024 (also referred to as a modem) coupled to one or more transceivers 1022 (e.g., cellular RF transceiver). The cellular baseband processor 1024 may include on-chip memory 1024'. In some aspects, the apparatus 1004 may further include one or more subscriber identity modules (SIM) cards 1020 and an application processor 1006 coupled to a secure digital (SD) card 1008 and a screen 1010. The application processor 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver). The Bluetooth module 1012, the WLAN module 1014, and the SPS module 1016 may include their own dedicated antennas and/or utilize the antennas 1080 for communication. The cellular baseband processor 1024 communicates through the transceiver(s) 1022 via one or more antennas 1080 with the UE 104 and/or with an RU associated with a network entity 1002. The cellular baseband processor 1024 and the application processor 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor 1024 and the application processor 1006 are each responsible for general processing, including the execution of software stored on the computer-readable medium/memory. The software, when executed by the cellular baseband processor 1024/application processor 1006, causes the cellular baseband processor 1024/application processor 1006 to perform the various functions described supra. The computer-readable medium/memory may also be used for storing data that is manipulated by the cellular baseband processor 1024/application processor 1006 when executing software. The cellular baseband processor 1024/application processor 1006 may be a component of the UE 350 and may include the memory 360 and/or at least one of the Tx processor 368, the Rx processor 356, and the controller/processor 359. In one configuration, the apparatus 1004 may be a processor chip (modem and/or application) and include just the cellular baseband processor 1024 and/or the application processor 1006, and in another configuration, the apparatus 1004 may be the entire UE (e.g., see UE 350 of FIG. 3) and include the additional modules of the apparatus 1004.

As discussed supra, the component 198 is configured to obtain a first set of audio packets based on a configured periodic cycle with a network node. The configured periodic cycle may be a CDRX cycle with the network node, or with a receiver UE. The component 198 may transmit, for the network node, a first set of UL transmissions associated with the first set of audio packets based on a first periodic time interval. The first periodic time interval may be different than the configured periodic cycle. The first periodic time interval may be based on a first multiplier and the configured periodic cycle. The component 198 may be within the cellular baseband processor 1024, the application processor 1006, or both the cellular baseband processor 1024 and the application processor 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1004 may include a variety of components configured for various functions. In one configuration, the apparatus 1004, and in particular the cellular baseband processor 1024 and/or the application processor 1006, includes means for obtaining a first set of audio packets based on a configured periodic cycle with a network node. The apparatus 1004 may include means for transmitting, for the network node, a first set of UL transmissions associated with the first set of audio packets based on a first periodic time interval. The apparatus 1004 may include means for obtaining the first set of audio packets based on the configured periodic cycle by obtaining the first set of audio packets based on the first periodic time interval. The apparatus 1004 may include means for transmitting, for the network node, a second set of UL transmissions associated with a second set of audio packets based on the configured periodic cycle. The apparatus 1004 may include means for transmitting, for the network node, a second set of UL transmissions associated with a second set of audio packets based on a second periodic time interval. The apparatus 1004 may include means for changing a state of the UE based on at least one of (a) a first change in a delay associated with a second set of transmissions of the UE and the first set of UL transmissions, (b) a second change in a BLER associated with the second set of transmissions of the UE and the first set of UL transmissions, (c) a third change in a HARQ occasion that is used to receive a HARQ-ACK associated with the second set of transmissions of the UE and the first set of UL transmissions, (d) a fourth change in a grant size associated with the second set of transmissions of the UE and the first set of UL transmissions, or (e) a fifth change in a power savings mode associated with the UE. The apparatus 1004 may include means for selecting the first multiplier and the second multiplier based on the changed state of the UE. The means may be the component 198 of the apparatus 1004 configured to perform the functions recited by the means. As described supra, the apparatus 1004 may include the Tx processor 368, the Rx processor 356, and the controller/processor 359. As such, in one configuration, the means may be the Tx processor 368, the Rx processor 356, and/or the controller/processor 359 configured to perform the functions recited by the means.

Figure 11:
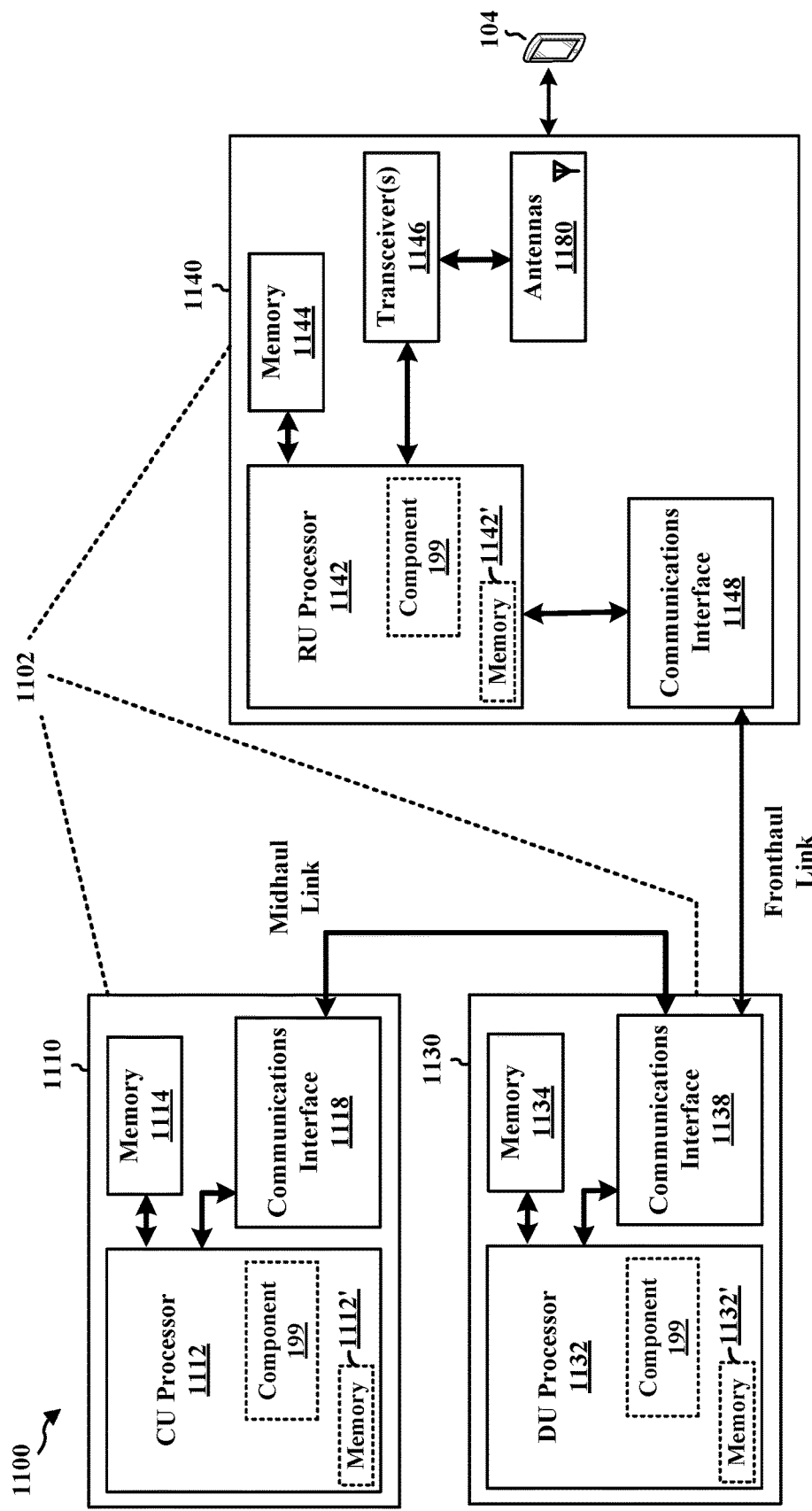
FIG. 11 is a diagram illustrating an example of a hardware implementation for an example network entity.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include a CU processor 1112. The CU processor 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include a DU processor 1132. The DU processor 1132 may include on-chip memory 1132'. In some aspects, the DU 1130 may further include additional memory modules 1134 and a communications interface 1138. The DU 1130 communicates with the RU 1140 through a fronthaul link. The RU 1140 may include an RU processor 1142. The RU processor 1142 may include on-chip memory 114T. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to receive, from a transmitter UE, a first set of UL transmissions associated with a first set of audio packets based on a first periodic time interval. The first periodic time interval may be different than a configured periodic cycle with the transmitter UE. The configured periodic cycle may be a CDRX cycle with the transmitter UE or a receiver UE. The first periodic time interval may be based on a first multiplier and the configured periodic cycle. The component 199 may output, for a receiver UE, the first set of UL transmissions associated with the first set of audio packets. The component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1102 may include a variety of components configured for various functions. In one configuration, the network entity 1102 may include means for receiving, from a transmitter UE, a first set of UL transmissions associated with a first set of audio packets based on a first periodic time interval. The network entity 1102 may include means for outputting, for a receiver UE, the first set of UL transmissions associated with the first set of audio packets. The network entity 1102 may include means for outputting the first set of UL transmissions associated with the first set of audio packets by outputting the first set of UL transmissions based on the first periodic time interval. The network entity 1102 may include means for outputting the first set of UL transmissions associated with the first set of audio packets by outputting the first set of UL transmissions based on the configured periodic cycle. The network entity 1102 may include means for receiving a UE capability from the receiver UE. The network entity 1102 may include means for selecting the first multiplier based on the received UE capability. The network entity 1102 may include means for outputting the first set of UL transmissions associated with the first set of audio packets to the receiver UE by outputting the first set of UL transmissions based on a second periodic time interval. The network entity 1102 may include means for receiving, from the transmitter UE, a second set of UL transmissions associated with a second set of audio packets based on the configured periodic cycle. The network entity 1102 may include means for outputting, for the receiver UE, the second set of UL transmissions associated with the second set of audio packets. The network entity 1102 may include means for outputting the second set of UL transmissions associated with the second set of audio packets to the receiver UE by outputting the second set of UL transmissions based on the first periodic time interval. The network entity 1102 may include means for outputting the second set of UL transmissions associated with the second set of audio packets to the receiver UE by outputting the second set of UL transmissions based on the configured periodic cycle. The network entity 1102 may include means for receiving, from the transmitter UE, a second set of UL transmissions associated with a second set of audio packets based on a second periodic time interval. The network entity 1102 may include means for outputting, for the receiver UE, the second set of UL transmissions associated with the second set of audio packets. The network entity 1102 may include means for outputting the second set of UL transmissions associated with the second set of audio packets by outputting the second set of UL transmissions based on the second periodic time interval. The network entity 1102 may include means for outputting the second set of UL transmissions associated with the second set of audio packets by outputting the second set of UL transmissions based on the first periodic time interval. The network entity 1102 may include means for outputting the second set of UL transmissions associated with the second set of audio packets by outputting the second set of UL transmissions based on the configured periodic cycle. The means may be the component 199 of the network entity 1102 configured to perform the functions recited by the means. As described supra, the network entity 1102 may include the Tx processor 316, the Rx processor 370, and the controller/processor 375. As such, in one configuration, the means may be the Tx processor 316, the Rx processor 370, and/or the controller/processor 375 configured to perform the functions recited by the means.

Figure 12:
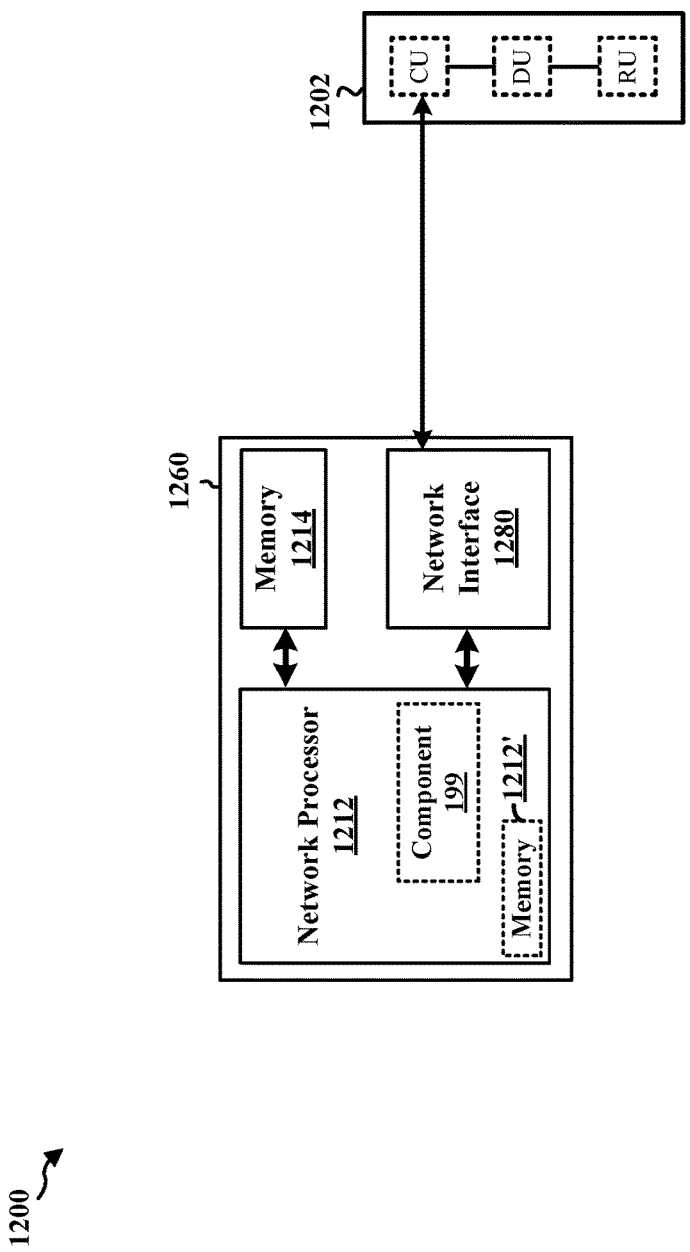
FIG. 12 is a diagram illustrating an example of a hardware implementation for an example network entity.

FIG. 12 is a diagram 1200 illustrating an example of a hardware implementation for a network entity 1260. In one example, the network entity 1260 may be within the core network 120. The network entity 1260 may include a network processor 1212. The network processor 1212 may include on-chip memory 1212'. In some aspects, the network entity 1260 may further include additional memory modules 1214. The network entity 1260 communicates via the network interface 1280 directly (e.g., backhaul link) or indirectly (e.g., through a RIC) with the CU 1202. The on-chip memory 1212' and the additional memory modules 1214 may each be considered a computer-readable medium/memory. Each computer-readable medium/memory may be non-transitory. The processor 1212 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a transmitter UE, a first set of UL transmissions associated with a first set of audio packets based on a first periodic time interval. The first periodic time interval may be different than a configured periodic cycle with the transmitter UE. The configured periodic cycle may be a CDRX cycle with the transmitter UE or a receiver UE.

The first periodic time interval may be based on a first multiplier and the configured periodic cycle. The component 199 may output, for a receiver UE, the first set of UL transmissions associated with the first set of audio packets. The component 199 may be within the processor 1212. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. The network entity 1260 may include a variety of components configured for various functions. In one configuration, the network entity 1260 includes means for obtaining a first set of audio packets based on a configured periodic cycle with a network node. The network entity 1260 may include means for transmitting, for the network node, a first set of UL transmissions associated with the first set of audio packets based on a first periodic time interval. The network entity 1260 may include means for obtaining the first set of audio packets based on the configured periodic cycle by obtaining the first set of audio packets based on the first periodic time interval. The network entity 1260 may include means for transmitting, for the network node, a second set of UL transmissions associated with a second set of audio packets based on the configured periodic cycle. The network entity 1260 may include means for transmitting, for the network node, a second set of UL transmissions associated with a second set of audio packets based on a second periodic time interval. The network entity 1260 may include means for changing a state of the UE based on at least one of (a) a first change in a delay associated with a second set of transmissions of the UE and the first set of UL transmissions, (b) a second change in a BLER associated with the second set of transmissions of the UE and the first set of UL transmissions, (c) a third change in a HARQ occasion that is used to receive a HARQ-ACK associated with the second set of transmissions of the UE and the first set of UL transmissions, (d) a fourth change in a grant size associated with the second set of transmissions of the UE and the first set of UL transmissions, or (e) a fifth change in a power savings mode associated with the UE. The network entity 1260 may include means for selecting the first multiplier and the second multiplier based on the changed state of the UE. The means may be the component 198 of the network entity 1260 configured to perform the functions recited by the means. The means may be the component 199 of the network entity 1260 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data.

The following aspects are illustrative only and may be combined with other aspects or teachings described herein, without limitation.

Aspect 1 is a method of wireless communication at a UE, where the method may include obtaining a first set of audio packets based on a configured periodic cycle with a network node. The method may include transmitting, for the network node, a first set of UL transmissions associated with the first set of audio packets based on a first periodic time interval. The first periodic time interval may be different than the configured periodic cycle. The first periodic time interval may be based on a first multiplier and the configured periodic cycle.

Aspect 2 is the method of aspect 1, where obtaining the first set of audio packets may include obtaining the first set of audio packets from a voice packetizer.

Aspect 3 is the method of any of aspects 1 and 2, where the first periodic time interval may be larger than the configured periodic cycle.

Aspect 4 is the method of any of aspects 1 to 3, where the first periodic time interval may be a product of the first multiplier and the configured periodic cycle. The first multiplier may include an integer greater than or equal to 2.

Aspect 5 is the method of aspect 4, where the first multiplier may be selected based on at least one of (a) a BLER associated with a second set of transmissions of the UE (b) a grant size associated with the second set of transmissions of the UE (c) a delay associated with the second set of transmissions of the UE, (d) a first size of the first set of UL transmissions, (e) a second size of the first set of audio packets, (f) a number of concurrent HARQ packets allocated to the UE, (g) a HARQ occasion that is used to receive a HARQ-ACK associated with the second set of transmissions of the UE, or (h) a power savings mode associated with the UE.

Aspect 6 is the method of any of aspects 4 to 5, where the first multiplier may be selected such that the first periodic time interval does not exceed a maximum delay threshold.

Aspect 7 is the method of aspect 6, where the maximum delay threshold may be based on at least one of (a) a length of time associated with the configured periodic cycle, (b) a latency mode associated with the UE, (c) a performance metric associated with the UE, (d) a battery condition associated with the UE, (e) a power savings mode associated with the UE, or (f) a thermal condition associated with the UE.

Aspect 8 is the method of any of aspects 6 to 7, where the maximum delay threshold may include an 80 ms cycle.

Aspect 9 is the method of any of aspects 4 to 8, where the configured periodic cycle may include at least one of a 20 ms cycle or a 40 ms cycle.

Aspect 10 is the method of any of aspects 1 to 9, where obtaining the first set of audio packets based on the configured periodic cycle may include obtaining the first set of audio packets based on the first periodic time interval.

Aspect 11 is the method of any of aspects 1 to 10, where the method may include transmitting, for the network node, a second set of UL transmissions associated with a second set of audio packets based on the configured periodic cycle.

Aspect 12 is the method of any of aspects 1 to 11, where the method may include transmitting, for the network node, a second set of UL transmissions associated with a second set of audio packets based on a second periodic time interval. The first periodic time interval may be a first product of the first multiplier and the configured periodic cycle and the second periodic time interval may be a second product of a second multiplier and the configured periodic cycle. The first multiplier and the second multiplier may both be integers. The first multiplier may be different than the second multiplier.

Aspect 13 is the method of any of aspects 1 to 12, where the method may include changing a state of the UE based on at least one of (a) a first change in a delay associated with a second set of transmissions of the UE and the first set of UL transmissions, (b) a second change in a BLER associated with the second set of transmissions of the UE and the first set of UL transmissions, (c) a third change in a HARQ occasion that is used to receive a HARQ-ACK associated with the second set of transmissions of the UE and the first set of UL transmissions, (d) a fourth change in a grant size associated with the second set of transmissions of the UE and the first set of UL transmissions, or (e) a fifth change in a power savings mode associated with the UE. The method may include selecting at least one of the first multiplier or the second multiplier based on the changed state of the UE.

Aspect 14 is a method of wireless communication at a network node, where the method may include receiving, from a transmitter UE, a first set of UL transmissions associated with a first set of audio packets based on a first periodic time interval. The first periodic time interval may be different than a configured periodic cycle with the transmitter UE. The first periodic time interval may be based on a first multiplier and the configured periodic cycle. The method may include outputting, for a receiver UE, the first set of UL transmissions associated with the first set of audio packets.

Aspect 15 is the method of aspect 14, where outputting the first set of UL transmissions associated with the first set of audio packets may include outputting the first set of UL transmissions based on the first periodic time interval.

Aspect 16 is the method of aspect 14, where outputting the first set of UL transmissions associated with the first set of audio packets may include outputting the first set of UL transmissions based on the configured periodic cycle.

Aspect 17 is the method of any of aspects 14 to 16, where the method may include receiving a UE capability from the receiver UE. The method may include selecting the first multiplier based on the received UE capability. Outputting the first set of UL transmissions associated with the first set of audio packets to the receiver UE may include outputting the first set of UL transmissions based on a second periodic time interval. The second periodic time interval may be a product of the first multiplier and the configured periodic cycle. The first multiplier may be an integer.

Aspect 18 is the method of any of aspects 14 to 17, where the first periodic time interval may be larger than the configured periodic cycle.

Aspect 19 is the method of any of aspects 14 to 18, where the first periodic time interval may be a product of the first multiplier and the configured periodic cycle. The first multiplier may be an integer greater than or equal to 2.

Aspect 20 is the method of aspect 19, where the first multiplier may be selected based on at least one of (a) a BLER associated with a second set of transmissions of the transmitter UE, (b) a grant size associated with the second set of transmissions of the transmitter UE, (c) a delay associated with the second set of transmissions of the transmitter UE, (d) a first size of the first set of UL transmissions, (e) a second size of the first set of audio packets, (f) a number of concurrent HARQ packets allocated to the transmitter UE, (g) a HARQ occasion that is used to receive a HARQ-ACK associated with the second set of transmissions of the transmitter UE, or (h) a power savings mode associated with the transmitter UE.

Aspect 21 is the method of any of aspects 19 to 20, where the first multiplier may be selected such that the first periodic time interval does not exceed a maximum delay threshold.

Aspect 22 is the method of aspect 21, where the maximum delay threshold may be based on at least one of (a) a length of time associated with the configured periodic cycle, (b) a latency mode associated with the transmitter UE, (c) a performance metric associated with the transmitter UE, (d) a battery condition associated with the transmitter UE, (e) a power savings mode associated with the transmitter UE, or (f) a thermal condition associated with the transmitter UE.

Aspect 23 is the method of any of aspects 21 to 22, where the maximum delay threshold may include an 80 ms cycle.

Aspect 24 is the method of any of aspects 19 to 23, where the configured periodic cycle may include at least one of a 20 ms cycle or a 40 ms cycle.

Aspect 25 is the method of any of aspects 14 to 24, where the method may include receiving, from the transmitter UE, a second set of UL transmissions associated with a second set of audio packets based on the configured periodic cycle. The method may include outputting, for the receiver UE, the second set of UL transmissions associated with the second set of audio packets.

Aspect 26 is the method of aspect 25, where outputting the second set of UL transmissions associated with the second set of audio packets to the receiver UE may include outputting the second set of UL transmissions based on the first periodic time interval.

Aspect 27 is the method of aspect 25, where outputting the second set of UL transmissions associated with the second set of audio packets to the receiver UE may include outputting the second set of UL transmissions based on the configured periodic cycle.

Aspect 28 is the method of any of aspects 14 to 27, where the method may include receiving, from the transmitter UE, a second set of UL transmissions associated with a second set of audio packets based on a second periodic time interval. The first periodic time interval may be a first product of the first multiplier and the configured periodic cycle and the second periodic time interval may be a second product of a second multiplier and the configured periodic cycle. The first multiplier and the second multiplier may both be integers. The first multiplier may be different than the second multiplier. The method may include outputting, for the receiver UE, the second set of UL transmissions associated with the second set of audio packets.

Aspect 29 is the method of aspect 28, where outputting the second set of UL transmissions associated with the second set of audio packets may include outputting the second set of UL transmissions based on the second periodic time interval.

Aspect 30 is the method of aspect, where outputting the second set of UL transmissions associated with the second set of audio packets may include outputting the second set of UL transmissions based on the first periodic time interval.

Aspect 31 is the method of any of aspects 14 to 30, where outputting the second set of UL transmissions associated with the second set of audio packets may include outputting the second set of UL transmissions based on the configured periodic cycle.

Aspect 32 is the method of any of aspects 1 to 13, where the configured periodic cycle may include a CDRX cycle with the network node.

Aspect 33 is the method of any of aspects 14 to 30, where the configured periodic cycle may include a CDRX cycle with the transmitter UE.

Aspect 34 is an apparatus for wireless communication, including: a memory; and at least one processor coupled to the memory and, based at least in part on information stored in the memory, the at least one processor is configured to implement any of aspects 1 to 33.

Aspect 35 is the apparatus of aspect 34, further including at least one of an antenna or a transceiver coupled to the at least one processor.

Aspect 36 is an apparatus for wireless communication including means for implementing any of aspects 1 to 33.

Aspect 37 is a computer-readable medium (e.g., a non-transitory computer-readable medium) storing computer executable code, where the code when executed by a processor causes the processor to implement any of aspects 1 to 33.

What is claimed is:

1. An apparatus for wireless communication at a user equipment (UE), comprising:
   memory; and
   at least one processor coupled to the memory and, based at least in part on information stored in the memory, the at least one processor is configured to:
      receive an indication of a connected mode discontinuous reception (CDRX) cycle associated with a second UE;
      obtain a first set of audio packets based on a configured periodic cycle; and
      transmit, for a network node, a first set of uplink (UL) transmissions associated with the first set of audio packets based on a first periodic time interval, wherein the first periodic time interval is different than the CDRX cycle and the configured periodic cycle, wherein the first periodic time interval is based on a first multiplier and the CDRX cycle.

2. The apparatus of claim 1, wherein to obtain the first set of audio packets, the at least one processor is configured to obtain the first set of audio packets from a voice packetizer.

3. The apparatus of claim 1, wherein the first periodic time interval is larger than the CDRX cycle.

4. The apparatus of claim 1, wherein the first periodic time interval is a product of the first multiplier and the CDRX cycle, wherein the first multiplier comprises an integer greater than or equal to 2.

5. The apparatus of claim 4, wherein the first multiplier is based on at least one of:
   a block error rate (BLER) associated with a second set of transmissions of the UE;
   a grant size associated with the second set of transmissions of the UE;
   a delay associated with the second set of transmissions of the UE;
   a first size of the first set of UL transmissions;
   a second size of the first set of audio packets;
   a number of concurrent hybrid automatic repeat request (HARQ) packets allocated to the UE;
   a HARQ occasion that is used to receive a HARQ acknowledgement (HARQ-ACK) associated with the second set of transmissions of the UE; or
   a power savings mode associated with the UE.

6. The apparatus of claim 4, wherein the first multiplier is based on the first periodic time interval not exceeding a maximum delay threshold.

7. The apparatus of claim 6, wherein the maximum delay threshold is based on at least one of:
   a length of time associated with the CDRX cycle;
   a latency mode associated with the UE;
   a performance metric associated with the UE;
   a battery condition associated with the UE;
   a power savings mode associated with the UE; or
   a thermal condition associated with the UE.

8. The apparatus of claim 6, wherein the maximum delay threshold comprises an 80 millisecond (ms) cycle.

9. The apparatus of claim 4, wherein the CDRX cycle comprises at least one of a 20 millisecond (ms) cycle or a 40 ms cycle.

10. The apparatus of claim 1, wherein, to obtain the first set of audio packets based on the CDRX cycle, the at least one processor is configured to obtain the first set of audio packets based on the first periodic time interval.

11. The apparatus of claim 1, further comprising a transceiver coupled to the at least one processor, wherein the at least one processor is further configured to:
   transmit, via the transceiver for the network node, a second set of UL transmissions associated with a second set of audio packets based on the CDRX cycle.

12. The apparatus of claim 1, wherein the at least one processor is further configured to:
   transmit, for the network node, a second set of UL transmissions associated with a second set of audio packets based on a second periodic time interval, wherein the first periodic time interval is a first product of the first multiplier and the CDRX cycle and the second periodic time interval is a second product of a second multiplier and the CDRX cycle, wherein the first multiplier and the second multiplier are both integers, wherein the first multiplier is different than the second multiplier.

13. The apparatus of claim 12, wherein the at least one processor is further configured to:
   change a state of the UE based on at least one of:
      a first change in a delay associated with a second set of transmissions of the UE and the first set of UL transmissions,
      a second change in a block error rate (BLER) associated with the second set of transmissions of the UE and the first set of UL transmissions,
      a third change in a HARQ occasion that is used to receive a HARQ acknowledgement (HARQ-ACK) associated with the second set of transmissions of the UE and the first set of UL transmissions,
      a fourth change in a grant size associated with the second set of transmissions of the UE and the first set of UL transmissions, or
      a fifth change in a power savings mode associated with the UE; and
   select at least one of the first multiplier or the second multiplier based on the changed state of the UE.

14. An apparatus for wireless communication at a network node, comprising:
   memory; and
   at least one processor coupled to the memory and, based at least in part on information stored in the memory, the at least one processor is configured to:
      transmit a UE capability of a receiver user equipment (UE) comprising a connected mode discontinuous reception (CDRX) cycle associated with the receiver UE;
      receive, from a transmitter UE, a first set of uplink (UL) transmissions associated with a first set of audio packets based on a first periodic time interval, wherein the first periodic time interval is different than the CDRX cycle, wherein the first periodic time interval is based on a first multiplier and the CDRX cycle; and
      output, for a receiver UE, the first set of UL transmissions associated with the first set of audio packets.

15. The apparatus of claim 14, wherein, to output the first set of UL transmissions associated with the first set of audio packets, the at least one processor is configured to output the first set of UL transmissions based on the first periodic time interval.

16. The apparatus of claim 14, further comprising a transceiver coupled to the at least one processor, wherein, to output the first set of UL transmissions associated with the first set of audio packets, the at least one processor is configured to output, via the transceiver, the first set of UL transmissions based on the CDRX cycle.

17. The apparatus of claim 14, wherein the at least one processor is further configured to:
   receive a UE capability from the receiver UE; and
   select the first multiplier based on the received UE capability, wherein to output the first set of UL transmissions associated with the first set of audio packets, the at least one processor is configured to output the first set of UL transmissions based on a second periodic time interval, wherein the second periodic time interval is a product of the first multiplier and the CDRX cycle, wherein the first multiplier comprises an integer.

18. The apparatus of claim 14, wherein the first periodic time interval is larger than the CDRX cycle.

19. The apparatus of claim 14, wherein the first periodic time interval is a product of the first multiplier and the CDRX cycle, wherein the first multiplier comprises an integer greater than or equal to 2.

20. The apparatus of claim 19, wherein the CDRX cycle comprises at least one of a 20 millisecond (ms) cycle or a 40 ms cycle.

21. The apparatus of claim 14, wherein the CDRX cycle comprises a connected mode discontinuous reception (CDRX) cycle with the transmitter UE.

22. The apparatus of claim 14, wherein the at least one processor is further configured to:
   receive, from the transmitter UE, a second set of UL transmissions associated with a second set of audio packets based on the CDRX cycle; and
   output, for the receiver UE, the second set of UL transmissions associated with the second set of audio packets.

23. The apparatus of claim 22, wherein, to output the second set of UL transmissions associated with the second set of audio packets to the receiver UE, the at least one processor is configured to output the second set of UL transmissions based on the first periodic time interval.

24. The apparatus of claim 22, wherein, to output the second set of UL transmissions associated with the second set of audio packets, the at least one processor is configured to output the second set of UL transmissions based on the CDRX cycle.

25. The apparatus of claim 14, wherein the at least one processor is further configured to:
   receive, from the transmitter UE, a second set of UL transmissions associated with a second set of audio packets based on a second periodic time interval, wherein the first periodic time interval is a first product of the first multiplier and the CDRX cycle and the second periodic time interval is a second product of a second multiplier and the CDRX cycle, wherein the first multiplier and the second multiplier are both integers, wherein the first multiplier is different than the second multiplier; and
   output, for the receiver UE, the second set of UL transmissions associated with the second set of audio packets.

26. The apparatus of claim 25, wherein, to output the second set of UL transmissions associated with the second set of audio packets, the at least one processor is configured to output the second set of UL transmissions based on at least one of the first periodic time interval, the second periodic time interval, or the CDRX cycle.

27. A method of wireless communication at a user equipment (UE), comprising:

receiving an indication of a connected mode discontinuous reception (CDRX) cycle associated with a second UE;

obtaining a first set of audio packets based on a configured periodic cycle; and transmitting, for a network node, a first set of uplink (UL) transmissions associated with the first set of audio packets based on a first periodic time interval, wherein the first periodic time interval is different than the CDRX cycle and the configured periodic cycle, wherein the first periodic time interval is based on a first multiplier and the CDRX cycle.

28. The method of claim 27, further comprising:

transmitting, for the network node, a second set of UL transmissions associated with a second set of audio packets based on a second periodic time interval, wherein the first periodic time interval is a first product of the first multiplier and the CDRX cycle and the second periodic time interval is a second product of a second multiplier and the CDRX cycle, wherein the first multiplier and the second multiplier are both integers, wherein the first multiplier is different than the second multiplier.

29. A method of wireless communication at a network node, comprising:

transmitting a UE capability of a receiver user equipment (UE) comprising a connected mode discontinuous reception (CDRX) cycle associated with the receiver UE;

receiving, from a transmitter UE, a first set of uplink (UL) transmissions associated with a first set of audio packets based on a first periodic time interval, wherein the first periodic time interval is different than the CDRX cycle, wherein the first periodic time interval is based on a first multiplier and the CDRX cycle; and outputting, for a receiver UE, the first set of UL transmissions associated with the first set of audio packets.

* * * * *